United States Patent [19]
Kirk

[11] Patent Number: 5,875,464
[45] Date of Patent: Feb. 23, 1999

[54] COMPUTER SYSTEM WITH PRIVATE AND SHARED PARTITIONS IN CACHE

[75] Inventor: David Brian Kirk, Monroeville, Pa.

[73] Assignee: International Business Machines Corporation, Armonk, N.Y.

[21] Appl. No.: 617,347

[22] Filed: Mar. 18, 1996

Related U.S. Application Data

[63] Continuation of Ser. No. 400,300, Mar. 6, 1995, abandoned, which is a continuation of Ser. No. 805,406, Dec. 10, 1991, abandoned.

[51] Int. Cl.$^6$ ..................................................... G06F 12/02
[52] U.S. Cl. .......................... 711/129; 711/121; 711/173
[58] Field of Search .................................. 364/200, 900, 364/DIG. 1; 395/425, 416, 456, 417, 859, 860; 711/121, 129, 170, 171, 172, 173, 207

[56] References Cited

U.S. PATENT DOCUMENTS

| | | | |
|---|---|---|---|
| 4,376,297 | 3/1983 | Anderson et al. | 711/207 |
| 4,430,712 | 2/1984 | Coulson et al. | 707/205 |
| 4,442,487 | 4/1984 | Fletcher et al. | . |
| 4,669,043 | 5/1987 | Kaplinsky | 711/3 |
| 4,847,755 | 7/1989 | Morrison et al. | 395/379 |
| 4,905,141 | 2/1990 | Brenza | 711/129 |
| 4,928,225 | 5/1990 | McCarthy et al. | 711/145 |
| 4,977,498 | 12/1990 | Rastegar et al. | . |
| 4,982,322 | 1/1991 | Eggers et al. | 711/152 |
| 5,025,366 | 6/1991 | Baror | . |
| 5,029,070 | 7/1991 | McCarthy et al. | 711/143 |

(List continued on next page.)

FOREIGN PATENT DOCUMENTS

0319871  10/1990   European Pat. Off. .

OTHER PUBLICATIONS

IBM Technical Disclosure Bulletin vol. 32, No. 8B, Jan., 1990, "Memory Management Mechanism To reduce Cache–Line Contention", pp. 25–26, by Kawachiya et al.

*Primary Examiner*—Tod R. Swann
*Assistant Examiner*—J. Peikari
*Attorney, Agent, or Firm*—Whitham, Curtis & Whitham; Arthur J. Samodovitz, Esq.

[57] ABSTRACT

The traditional computer system is modified by providing, in addition to a processor unit, a main memory and a cache memory buffer, remapping logic for remapping the cache memory buffer, and a plurality of registers for containing remapping information. With this environment the cache memory buffer is divided into segments, and the segments are one or more cache lines allocated to a task to form a partition, so as to make available (if a size is set above zero) of a shared partition and a group of private partitions. Registers include the functions of count registers which contain count information for the number of cache segments in a specific partition, a flag register, and two register which act as cache identification number registers. The flag register has bits acting as a flag, which bits include a non-real time flag which allows operation without the partition system, a private partition permitted flag, and a private partition selected flag. With this system a traditional computer system can be changed to operate without impediments of interrupts and other prior impediments to a real-time task to perform. By providing cache partition areas, and causing an active task to always have a pointer to a private partition, and a size register to specify how many segments can be used by the task, real time systems can take advantage of a cache. Thus each task can make use of a shared partition, and know how many segments can be used by the task. The system cache provides a high speed access path to memory data, so that during execution of a task the logic means and registers provide any necessary cache partitioning to assure a pre-empted task that it's cache contents will not be destroyed by a preempting task. This permits use of a software controlled partitioning system which allows segments of a cache to be statically allocated on a priority I benefit basis without hardware modification to said system. The cache allocation provided by the logic gives consideration of the scheduling requirements of tasks of the system in deciding the size of each cache partition. Accordingly, the cache can make use of a for dynamic programming implementation of an allocation algorithm which can determine an optimal cache allocation in polynomial time.

20 Claims, 9 Drawing Sheets

U.S. PATENT DOCUMENTS

| | | | |
|---|---|---|---|
| 5,109,512 | 4/1992 | Bahr et al. | 395/673 |
| 5,247,648 | 9/1993 | Watkins et al. | 711/143 |
| 5,265,232 | 11/1993 | Gannon et al. | 711/124 |
| 5,291,442 | 3/1994 | Emma et al. | 711/120 |
| 5,357,623 | 10/1994 | Megory-Cohen | 711/129 |
| 5,513,353 | 4/1996 | Fujimoto | 707/9 |

(a)
(b) INCREASED EXECUTION TIME DUE TO CACHE STALL

TASK 1  $C_1 = 1$  $T_1 = 5$  $U_1 = .2$
TASK 3  $C_3 = 1$  $T_3 = 9$  $U_3 = .11$ a) TASK 4 RUNS TO COMPLETION WITHOUT ANY PREEMPTIONS

TASK 2  $C_2 = 1$  $T_2 = 7$  $U_2 = .14$
TASK 4  $C_4 = 3$  $T_4 = 20$  $U_4 = .15$

= THE $C_{stall}$ COMPONENT OF TASK 4 b) TASK 4 COMPLETES AFTER FOUR PREEMPTIONS

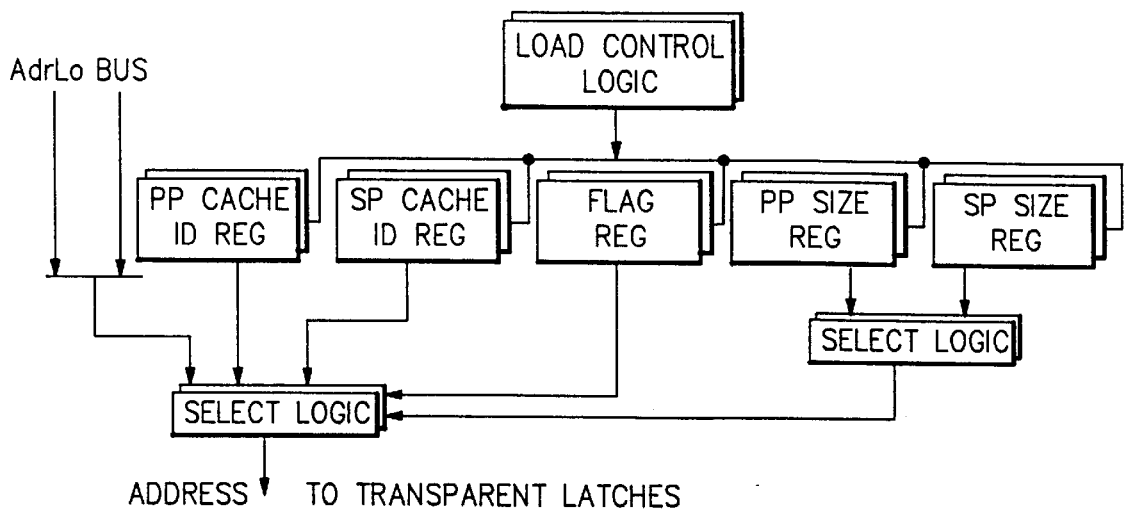
FIG. 11
| TASK | CACHE-ID | MASK | SIZE FLD |
|---|---|---|---|
| SHARED PARTITION | 00000 | 00aaa | 00111 |
| TASK_0 | 01000 | 01aaa | 00111 |
| TASK_1 | 10000 | 100aa | 00011 |
| TASK_2 | 10100 | 101aa | 00011 |
| TASK_3 | 11000 | 1100a | 00001 |
| TASK_4 | 11010 | 1101a | 00001 |
| TASK_5 | 11100 | 1110a | 00001 |
| TASK_6 | 11110 | 11110 | 00000 |
| TASK_7 | 11111 | 11111 | 00000 |
| TASK_8 | 00000 | 00aaa | xxxxx |
| TASK_9 | 00000 | 00aaa | xxxxx |
| EXECUTIVE | 00000 | 00aaa | xxxxx |
| INTERRUPT ROUTINE | 00000 | 00aaa | xxxxx |
FIG. 13
FIG. 14
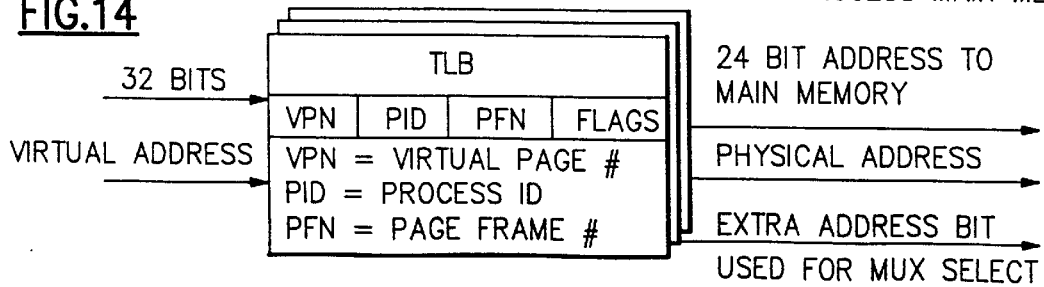
NOTE: —R3000 SYSTEM WITH 16MBYTES OF MAIN MEMORY
—ADDRESS BITS 23-0 ARE USED TO ACCESS MAIN MEMORY (a) ORIGINAL TIMING FOR CACHE ACCESS (b) MODIFIED TIMING FOR SMART CACHE ACCESS

COMPUTER SYSTEM WITH PRIVATE AND SHARED PARTITIONS IN CACHE

The application is a continuation, of application Ser. No. 08/400,300, filed Mar. 6, 1995, abandoned, which is a continuation of application Ser. No. 07/805,406, filed Dec. 10, 1991, now abandoned.

FIELD OF THE INVENTION

These inventions relate to computers and computer systems and particularly to computer systems having a cache and which are used for implementing real-time tasks.

BACKGROUND OF THE INVENTION

As background for our invention the present application relates to computer systems, which have an execution unit or processor known as a central processing unit or CPU, a main memory and a cache system. The cache is a memory which functions as a small fast barrier that is placed between the CPU and main memory to provide the functionality of the main memory at the speed of the CPU.

The first commercially successful system which employed a cache was the IBM 360/85, a 1969 mainframe system. Since then many system employ a cache, and today, personal computers and workstations have a cache. However, while it has been recognized that a cache may increase the overall system performance by reducing or eliminating processor wait states during memory access, caches are noticeably absent in real time systems which have real or hard deadlines which must be matched to effectively perform the required tasks.

Prior cache designs result in unpredictable performance improvements and therefor are not used or are disabled so they can not be utilized in "hard" real-time systems. Real-time system require predicable execution time in order to guarantee that the hard deadlines are met. Cache memories, while providing significant performance improvements over conventional memory designs, result in unpredictable execution times when exposed to task preemptions and interrupts and cache cold starts. As a result generally real time systems currently are trending toward algorithmic scheduling, as I discussed in my presentation on "Process Dependent Static Cache Partitioning for Real Time Systems", Proceedings of the Read-Time Systems Symposium, pp 181–190, Huntsville, Ala., December 1988.

Others might approach the problem with multiple, bank switched, caches or some method of unloading the contents of a cache, as part of a task swap out, then reloading the cache when the task is swapped in, these other approaches would be more expensive and slower than desirable.

The patent art includes a quite a number of patents dealing with cache memory organizations. U.S. Pat. 4,442,487 to Fletcher et al, issued Apr. 10, 1984 for instance, deals with a multi-processing memory for a processor, and how processors can share cache, not how multi-tasks can share cache. U.S. Pat. 5,025,366 to Baror, issued Jun. 18,1991 is a recent example of how cache can be employed on a single chip, and U.S. Pat. 4,997,498 issued Dec. 11, 1990 deals with a data processing system having a data memory interlock, as an example of line lock. The current improvements can be employed whether or not the cache is located on the chip, or externally. The line locking used by the cache memory need not be used with the current improvements, but it could be.

It also has been recognized by the general references which are discussed as general background (Thiebaut, Stone and Wolf, An internal IBM Technical Report entitled A Theory of Cache Behavior) that a computer system can have a cache which is partitioned for data and instruction to optimize cache performance, which does not handle predictability. A computer called ELXSI System 6400 has been also generally discussed. This computer is targeted for real time systems and provides partitioning. However, the dynamic allocation of these partitions prevents cache predictability.

Within International Business Machines it has been suggested, as illustrated by European Patent Application Publication No.0 391 871 published Oct. 10, 1990 on application 90850122.4, by Kevin Smith that one could within hardware dynamically allocate cache size based on a data structure. This patent is directed to a way of optimize performance, not to achieve the predictability of real-time requirements. IBM Technical Disclosure Bulletin Vo. 32. No. 8B, of January 1990 by K. Kawachiya et al, entitled Memory Management Mechanism to Reduce Cache-Line Contention, suggested partitioning a cache into functional areas to avoid contention. They suggest address mapping as a method of partitioning. Once again, this does not provide the necessary predictability.

Generally, systems which are designed for real-time applications could benefit from cache performance improvements if the effects of interrupts and preemptions can be overcome to provide a predictable cache operation.

SUMMARY OF THE INVENTION

The improvements of the subject invention can be applied to main frame as well as chip level CPU systems, by providing a cache system for such computers which overcomes the problem of cache perturbance because of task switching in multitasking systems. The cache system provides a way of protecting a task's cache region to prevent other tasks in a multitasking environment from perturbing the cache, thus allowing all the benefits of a cache while also providing predictable cache execution times as necessary in real-time system performance.

Furthermore, the cache system described below overcomes the need for cache refill after a task, formally having had the cache filled, is swapped back in. During swap-out the cache will have been filled by another task resulting in dramatic speed improvements in system performance.

The invention can be employed in a traditional computer system having a processor unit, a main memory and a cache memory buffer, by providing logic for remapping the cache memory buffer, and a plurality of registers for containing remapping information. With this environment the cache memory buffer is divided into segments, and the segments are one or more cache lines allocated to a task to form a partition, so as to make available (if a size is set above zero) of a shared partition and a group of private partitions.

The preferred embodiment of the computer system cache memory buffer registers include the functions of count registers which contain count information for the number of cache-segments in a specific partition, a flag register, and two register which act a's cache identification number registers. The flag register has bits acting as a flag, which bits include a non-real time flag which allows operation without the partition system, a private partition permitted flag, and a private partition selected flag.

With this system a traditional computer system can be changed to operate without impediments of interrupts and other prior impediments to a real time task to perform. By providing cache partition areas, and causing an active task to always have a pointer to a private partition, and a size register to specify how many segments can be used by the task, real time systems can take advantage of a cache. Thus each task can make use of a shared partition, and know how many segments can be used by the task.

The system cache provides a high speed access path to memory data, so that during execution of a task the logic means and registers provide any necessary cache partitioning to assure a preempted task that it's cache contents will not be destroyed by a preempting task. This permits use of a software controlled partitioning system which allows segments of a cache to be statically allocated on a priority/benefit basis without hardware modification to said system.

The cache allocation provided by the logic gives consideration of the scheduling requirements of tasks of the system in deciding the size of each cache partition. Accordingly, the cache can make use of a for dynamic programming implementation of an allocation algorithm which can determine an optimal cache allocation in polynomial time.

These and other improvements, illustrating all three architectural approaches, are set forth in the following detailed description. For a better understanding of the inventions, together with advantages and features, reference may be had to the co-pending applications for other developments we have made in the field. However, specifically as to the improvements, advantages and features described herein, reference will be made in the description which follows to the below-described drawings.

BRIEF DESCRIPTION OF THE DRAWINGS.

FIG. 11 shows a high level addition to the prior art which enables implementation of the inventions a traditional system.

FIG. 13 is a table illustrating an example of cache allocation parameters.

FIG. 14 illustrates how a MIPS machine can use an alternative access mechanism for the shared partition.

Figure 1:
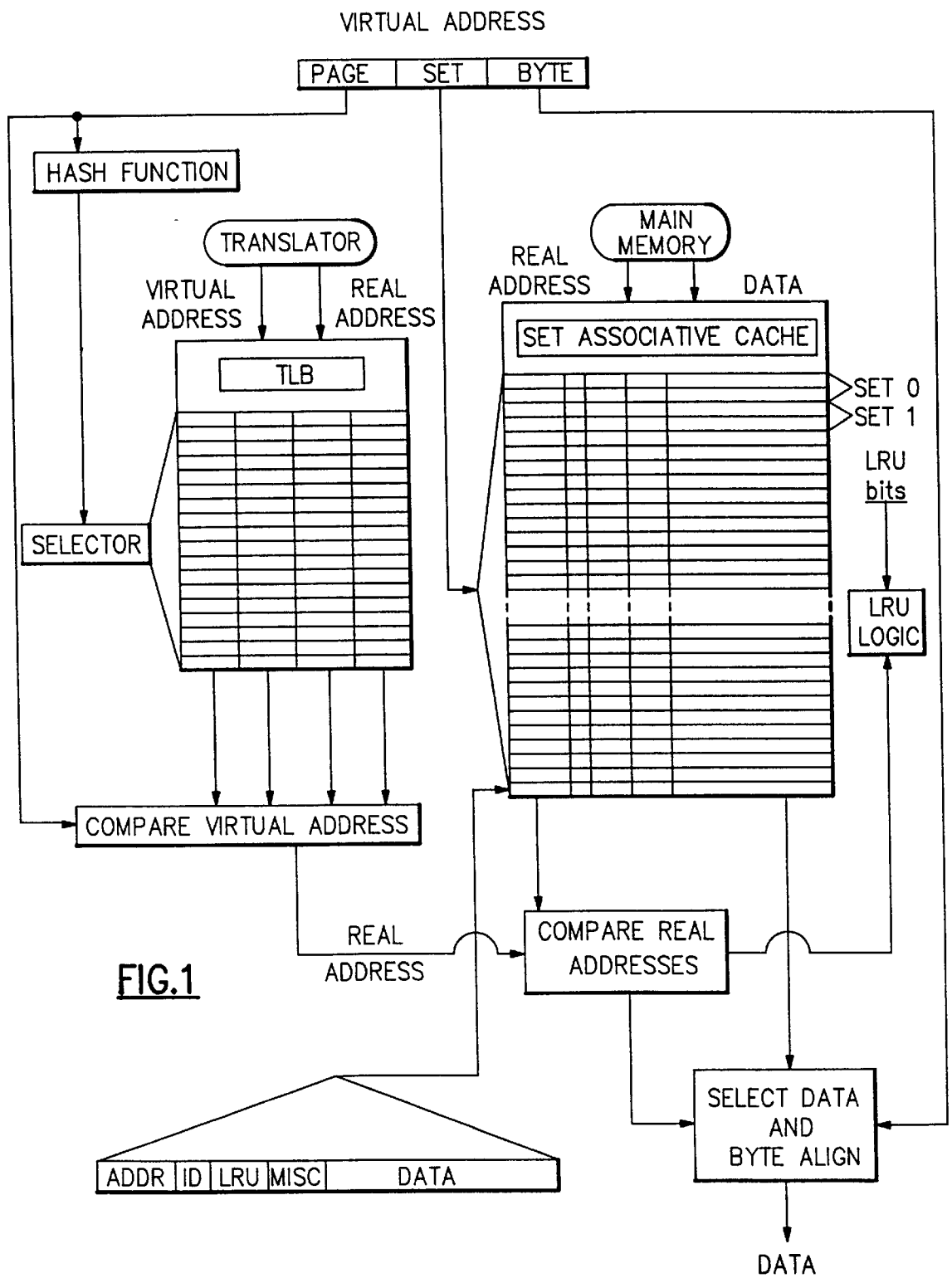
FIG. 1 shows a typical prior art example of a cache.

DETAILED DESCRIPTION OF THE INVENTIONS.

In accordance with my invention, the cache system can be employed in a variety of traditional systems, and I have chosen a MIPS R3000 as an illustrative preferred embodiment.

Before considering the preferred embodiment in detail, it may be worthwhile to highlight a few features which can now be recognized to allow use of cache designs in real-time systems.

1. A cache's does have a natural ability to provide a high speed access path to memory data.
2. Cache partitioning can assure a preempted task that it's cache contents will not be destroyed by the preempting task (thereby ensuring consistent execution times for a specific code sequence),
3. My software controlled partitioning system allows segments of cache to be statically allocated on a priority/benefit basis without any hardware modifications,
4. My cache allocation approach allows consideration of system deadlines (i.e. the scheduling requirements) in deciding the size of each cache partition, and
5. The dynamic programming implementation of the allocation algorithm can determine an optimal cache allocation algorithm in polynomial time. As a result of the improvements which will be described.

I have provided a system which has a cache which can be used in real-time systems which require predictable task execution times in order to assure that system deadlines are met.

Results of 5 to 10 times speed improvements (or higher), depending on the ratio of cache speed to main memory speed, over systems with no cache (or a disabled) cache may be found with systems such as the USAF RH-32 processor.

Turning now to the invention in greater detail, it will be worthwhile to discuss further the background and then proceed to what I call my SMART partitioning cache system design. In this process I will begin with a further background section, discussing algorithmic scheduling in real-time systems and caches in real-time system. I will then discuss some related research so that a reader will then be able to appreciate the improvements discussed relating to the SMART partitioning detailed discussion below.

Tom Hand ("Real-Time systems need predictability." *Computer Design RISC Supplement*:57–59, August, 1989) states that "In real-time system, a late answer is a wrong answer. Predictability is the essential factor embedded real-time systems".

As computer technology becomes increasingly advanced, the applications of computer systems are expanding rapidly. One of these expanding applications areas is the realm of real-time computing systems. Real-time computers now control -such operations as nuclear reactors, aircraft navigation, robotic systems, weapon Systems, image-processing, and automated manufacturing facilities. Within these systems, computer dependency has spread to span a spectrum ranging from monitoring operational safety status (NASA space shuttle) to providing retaliatory and containment processing in response to a national emergency threat.

Real-time computer systems are used primarily for monitoring and controlling physical processes. In many eases, the tasks within this system must react to external events and data reported by process sensors and actuators. The dynamics of the underlying physical process result in explicit task timing requirements (deadlines) which must be met to ensure the correctness and safety of the real-time system. This notion of time is the primary difference between real-time and general-purpose computer systems. In real-time systems, the usefulness of a result is a function of both its accuracy and the time at which the result is produced. This time-value of a result is expressed as a constraint which if missed can cause system failure. The safety and integrity of these time-driven systems can only be assured if the system remains predictable. Thus, predictability is a fundamental requirement of such systems. Task timing constraints include hard (critical) and soft (less critical) deadlines for both sensor-driven periodic data and event-driven aperiodic data.

Historically, hand-crafted techniques were used to ensure the timing correctness by statically binding task execution "slices" to fixed slots along a timeline. This scheduling procedure, referred to as a cyclic executive, guarantees all task deadlines. However, slight changes in system specifications often require that the timeline be entirely restructured. This ad hoc approach to scheduling resulted in brittle systems which were expensive to develop and both extremely difficult and costly to upgrade and maintain.

With software development and maintenance becoming the dominant component of complex real-time systems' life cycle costs, it has become necessary for these Systems to be designed on a sound technical foundation which results in analyzable timing behavior. This analyzability property allows system modification without excessive test and integration costs. For this reason, the use of scientifically based algorithmic scheduling is gradually replacing the ad hoc technique of cyclical executives. The goal of-this approach is to transform the art of handcrafting real-time systems into a science of designing real-time systems. The resulting scientific discipline provides system timing models which allow analyzability and predictability.

The Advanced Real-time Technology project at Carnegie Mellon University has been developing algorithmic scheduling solutions that guarantee individual task execution times in multi-tasking, interrupt-driven real-time environments. This scheduling theory ensures the timing correctness of real-time tasks without the costly handcrafting and exhaustive testing associated with the timeline scheduling approach. furthermore, this algorithmic scheduling technique supports dynamic, process-level reconfiguration which provides high, system dependability when constrained by limited hardware resources.

Algorithmic scheduling policies use static or dynamic priority assignments to guarantee that the system timing constraints are met. Two such algorithms are the rate monotonic (static) and the deadline driven (dynamic) scheduling techniques. Liu and Layland (Scheduling Algorithms for Multiprogramming in a Hard-Real-Time Environment, *Journal of the Association for Computing Machinery* 20(1):46–61, January, 1973) showed these algorithms to be optimal for scheduling periodic tasks under idealized conditions. Optimal is defined so that if a task set is schedulable by any other static algorithm, it is schedulable by the rate monotonic algorithm. A similar definition holds for dynamic algorithms and the deadline driven approach.

In general, dynamic priority algorithms have a utilization bound of 100%, but frequently suffer from high run-time overhead. Static priority algorithms require little run-time overhead, offer predictable performance, handle conditions such as transient overload and data sharing, and attain reasonable levels of schedulable utilization. Schedulable utilization is a commonly used scheduling performance metric and refers to the processor utilization level under which the deadlines of all tasks can be guaranteed. The remainder of this discussion will assume a rate-monotonic scheduling approach, but this in no means restricts the use of this research to rate-monotonic scheduling. This research is applicable to other priority-based, preemptive scheduling systems.

Under the rate monotonic algorithm, the priorities assigned to periodic tasks are directly proportional to their rate of requests. Assuming a task requests service once each period, the task with the shortest period will have the highest priority. Liu and Layland proved that this algorithm guarantees that n independent periodic tasks can be scheduled to meet all task deadlines if the sum of the task utilizations (defined as the task computation time divided by the task period) for all n tasks is less than $n(2^{1/n}-1)$. This bound converges to in 2 (=0.69) for large n. This bound, however, is conservative, and represents the worst case conditions. The average case scheduling bound is 88%. In practice, the bound is often between 90 and 100% because task periods are often harmonic or nearly harmonic.

Tom Hand ("Real-Time systems need predictability." Computer Design RISC Supplement:57–59, August, 1989.) also states that "If pipelines and caches lead to nonpredicatable behavior, stay away from them".

Cache memories are small, fast buffers, placed between the CPU and main memory, which provide the functionality of main memory at the speed of the CPU. The general purpose computing community has been very successful in using caches to take advantage of the program properties of temporal and spatial locality. By exploiting these properties, the cache attempts to ensure that information, local both in time and in space to the current information, is readily available. In these hierarchical memory systems, all memory references are first presented to a cache structure similar to the one shown in FIG. 1. A comparison is performed on the most significant real address bits with the address (or Tag) field of the appropriate cache line(s) as shown in FIG. 1. When successful, the memory request results in a cache hit, and the access is performed at the speed of the cache. When it fails, the request results in a cache miss, and the access is performed at the speed of main memory—often three or four times slower than the cache.

The general purpose computing community is primarily concerned. with total system throughput, average response times, and fairness. Conventional cache designs have therefore been optimized for average case performance which has yielded average memory access times near the speed of the cache. In contrast, the real-time computing community is primarily concerned with ensuring that individual task execution times are predictable. These systems must therefore rely upon worst ease performance analysis to provide the necessary timing guarantees. Unfortunately, there is a wide gap between the average case cache performance of general purpose computing and the worst case cache performance required for time critical real-time computing.

David Simpson states (Real-Time RISC's *Systems Integration*:35–38, July, 1989) that "However, because the goal of real-lime processing is deterministic, or predictable response times, caches pose a problem . . . . Performance goes up . . . but real-time performance does not scale in proportion".

Caches have not been widely embraced by the real-time community due to the large variability in performance and the resulting unpredictable task execution times. In the absence of caches, the effects of task preemptions and interrupts can be predictably accounted for. However, in cache-based systems, preemptions and interrupts modify the cache contents, and lead to a phenomenon known as cold-start. A cache cold-start occurs whenever there is a significant change in the working set of the task in execution. Cold-starts result in reload transients while the cache reloads the reactivated working set. During the reload transient, the hit rate is significantly lower than during normal cache operation.

This is particularly true for multi-tasking, interrupt-driven environments which are typical of most real-time applications. In such cases, wide variability in individual task execution times arise from real-time tasks interacting with the external environment via the operating system. In addition, interrupts are often generated as a result of internal system hardware such as real-time clocks and timers. As a result, execution times for a specific segment of code will vary with the number and phasing of these events.

Figure 2:
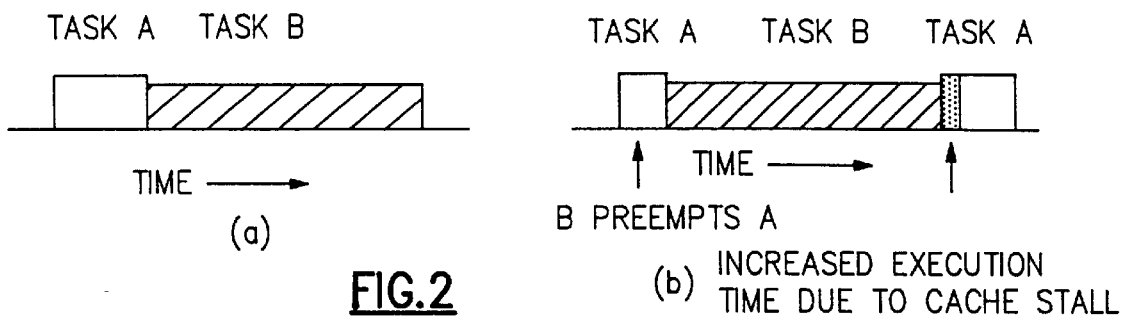
FIG. 2 is a timing diagram showing task execution with and without cache stalls.

The execution time, C, for any task is composed of two components: $C_{deal}$ the execution time of the task running with a cache which never misses; and $C_{stall}$ the time the processor is stalled while waiting for the main memory access during a cache miss. While the $C_{ideal}$ component remains constant regardless of scheduling activity, the $C_{stall}$ component increases as preemption induced cold-starts lower the cache hit rate. The effect of this lower hit rate on execution times is depicted in FIG. 2 where an extra cold-start was introduced by a scheduling decision which allowed Task B to preempt Task A. The impact on the $C_{stall}$ component of the execution time is dependent on the number of cache lines previously owned by Task A that were displaced by Task B. The shaded region in FIG. 2b represents the increase in the $C_{stall}$ time.

As Stone points out, even if two programs could have fit in the cache simultaneously, the probability for conflict is high, because the cache lines that each program occupies are not strategically distributed to avoid overlap. As a result of these overlapping footprints, the preempting task displaces useful lines of the preempted task. When the preempted task resumes, it incurs an unusually high miss rate and a corresponding increase in the stall component of-the execution time.

Figure 3:
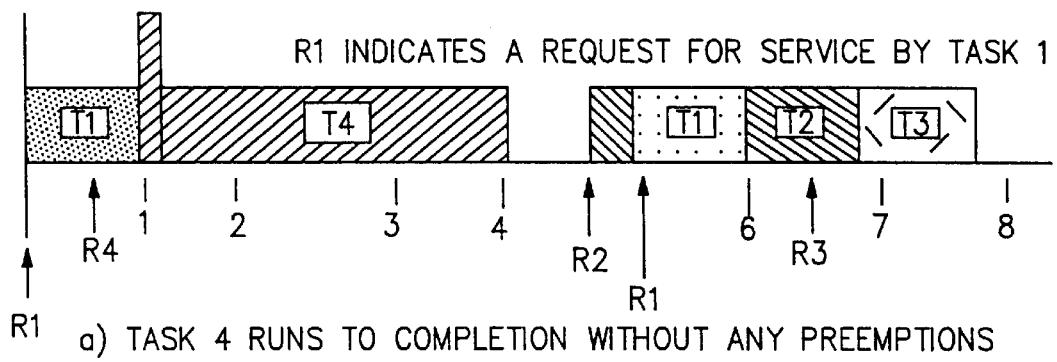
FIG. 3 is another timing diagram showing execution time variance due to task preemption.
Figure 3:
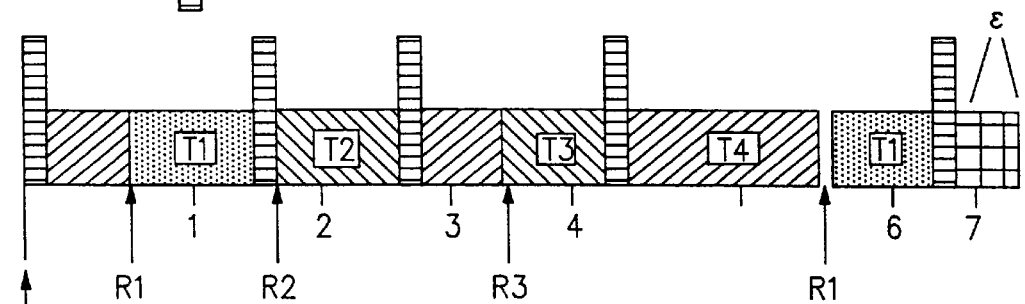

FIG. 3 depicts the vulnerability of low priority tasks to the effects of task phasing in determining the extent of the cache reloads. In FIG. 3a, the low priority task runs to completion uninterrupted, and incurs only the initial cache cold-start (indicated by the taller checkered region). However, in FIG. 3b, this same task is preempted several times due to an alteration of task phasing. The resulting increase in the task's stall component is shown by the additional taller checkered regions, and the total change in the execution time is indicated as E. While this example focuses on the impact to the lower priority task, even the highest priority task can be subject to reload-transients caused by interrupt service routines and other executive routines which share the cache.

Currently, real-time systems that do include caches perform their timing analysis as if the caches were not present and either disable the cache or use it to handle transient overloads.

David Simpson also states (Real-Time RISC's *Systems Integration.* 35–38, July, 1989.) "One way to address the cache drawback, in applications that require a high degree of determinism, is to run the RISC chip in "uncached mode" for the sections of application code that demand absolute predictability, or guaranteed response times".

This is the case in the U.S. Navy's AEGIS Combat System. The AN/UYK-43 computer, which provides the central computing power to the system, has a 32K-word cache that is partitioned for instructions and data. However, due to unpredictable cache performance, all module (task) utilizations are calculated as if the cache were turned off (cache bypass option). As a result, the theoretically overutilized CPU is often underutilized at run-time when the cache is enabled.

As technology permits, increasing amounts of logicare supporting software control of certain caching functions. This software control, when properly utilized, can provide predictable cache results. While predictable, the resulting poor cache performance does little to narrow the performance gap between the average case and worst case execution times. It does, however, open the research avenue of investigating software/compiler assisted cache control approaches. For example, the Intel i486 provides a technique for disabling cache refills while allowing writes to the cache. This particular software control can be used to provide one of the cache locking techniques discussed herein later. The Motorola MC680x0 processor family provides a similar function by way of the cache control register which contains a cache freeze bit. When this bit is set, cache misses do not replace existing cache lines, however, cache hits are unaffected.

The working set model has often been used to define program behavior since it was introduced by Denning (The Working Set Model of Program Behavior. *Communications of the Association for Computing Machinery* 11(5):323–333, May, 1968) to describe virtual memory behavior. The working set was formally defined as the minimum set of pages that must be loaded in main memory for the process not to incur any "unnecessary" page faults. Denning goes on to state that his work will consider the units named in the working set to be pages of memory, but they could be any other unit of information (such as lines in a cache).

Denning's research proposed that the most recent page reference behavior was a good predictor of the immediate future. For this reason, it is possible to control page replacement policies by sampling past performances over a specified interval. Pages that have not been used during this interval are not considered part of the working set, and are targeted for replacement. Selection of the sampling interval is a function of two issues. If the interval is too small, then useful pages are removed from the memory too soon. If the interval is too large, pages that are no longer useful are kept in memory, and main memory space is wasted, resulting in fewer working sets being able to occupy main memory at once. Denning recommends that the interval be selected by the time needed to transfer a page from auxiliary storage to main memory. This same replacement philosophy can be directly applied to lines of cache, and is closely related to the LRU replacement policy.

A commonly used method of simulating an LRU based cache design involves a stack representation of the cache contents. For fully-associative caches, all references are ordered in a stack with the most recent on top. If the current reference is at depth d, then all caches of size equal to or more than d will result in a hit for this reference. For set-associative caches, a stack is maintained for each congruence class (set). For the example above, a hit results if the cache has set-associativity greater than d. Studies by So and Rechtschaffen used this approach to evaluate the cache hit rates in relation to the Most Recently Used (MRU) line in a congruence class. This study showed that nearly 90% of the cache hits occur in the MRU line of the respective set. The research assumed a 64 KByte, 4-way set-associative cache with a line size of 32 words and an LRU replacement policy. Other cache configurations were also tested.

The work by So and Rechtschaffen (Cache Operations by MRU Change. *IEEE Transactions of Computers* 37(6)

:700–709, June, 1998) concluded that it is possible to associate a set of MRU lines with a working set of the task, and that an access to a non-MRU line suggests a change in the working set. The evaluation of these conclusions was performed using an address trace generated from 23 million instructions in three areas: database management, scientific applications, and batch processing. Applications with characteristically large working sets were used to generate address traces of sufficient length to minimize the effects of cache initialization.

Simulation of these address traces on the 64KByte basic cache structure showed that an average of 95.5% of the cache hits occurred in the MRU. Even more significant to the research on predictable caches is the finding that for a cache size of as little as 4 KBytes, 80% of the cache hits were in the MRU stack consisting of only 256 words. In addition, the overall hit rate in the MRU stack was as high as 75%, and averaged close to 65%. Thus relatively small working sets can provide significant contributions to the cache hit rate. This result is further supported by this research.

Cache partitioning schemes used in the past have typically separated data from instructions. These physically separate caches are smaller and therefore faster, as well as capable of being accessed in parallel. Both of these factors provide an increase in cache bandwidth. However, arguments against cache partitioning state that since the cache of size S has been partitioned into two caches of size S/2, space in one cache is wasted as the program becomes very instruction or data oriented.

The approach taken by Thiebaut, Stone and Wolf (*A Theory of Cache Behavior*. Technical Report, IBM Research Division, Yorktown, N.Y., 1987) used a fractal model of cache behavior presented by Thiebaut (Models of Cache Behavior, Ph.D. Thesis, University of Massachusetts, 1987). In this approach to partitioning, access patterns are evaluated to derive a few basic parameters from which the cache miss ratio is predicted. Partitions are formed in a way that minimizes the overall cache miss ratio. Each line of cache to be allocated is temporarily given to each partition. The partition with the highest resulting increase in performance is then allocated the cache line permanently. This procedure continues until all of the cache lines have been allocated.

This partitioning scheme is very similar to the idea used by the SMART partitioning strategy. Thiebaut's work was intended to be used in conjunction with a large sample of program behaviors to determine the optimal partitioning between instruction and data caches. The results of the study could then be used to aid in determining the hardware supported partitioning scheme.

In the past, commercial processors have provided techniques for partitioning the virtual memory systems to allow locking of certain (usually Operating System functions/data) information in memory. Recently, some processors have started to provide similar functions for managing the cache systems. The following discusses one such system.

The ELXSI System 6400 is a tightly coupled bus-oriented multiprocessor which supports up to ten 6460 CPUs and is targeted for real-time applications such as flight simulators. The byte-addressable virtual memory uses a 32-bit address, and supports between 16 MB and 2 GB of main memory partitioned into 2K pages. To aid real-time applications, these 2K pages can be frozen in main memory. This is accomplished by either freezing the process, which retains every page that the process accesses in memory, or by freezing individual pages.

Each 6460 CPU has a 1MB cache which is divided into separate 512 KB data and instruction caches. In addition, the cache can be partitioned into eight individual caches each owned by one or more processes. This is done by restricting the cache hash range such that no two processes overlap. By preventing overlap, ELXSI provides a method for real-time programmers to assure that a task remains resident in cache regardless of the frequency of execution. This is particularly useful in the ease of alarms which may not occur often but when they do occur should be handled as quickly as possible. More information on this approach will be presented later in this paper.

Trace scheduling is a procedure that was originally developed for microcode compaction. Fisher found that most parallelism is found beyond the basic blocks to which most compaction algorithms are applied. For this reason, trace scheduling looks beyond the basic blocks of a program flow graph to perform compaction. Rather than consider branches to be block boundaries, branch prediction is used to develop traces of microinstruction sequences. Each trace represents a path through the code that could be taken for a specific choice of data. The compaction techniques are then applied to the paths most likely to be executed.

A similar approach can be used in exploiting the program knowledge available to the compiler to enhance the performance and predictability of cache based memory systems. Processors which support cache control instructions such as cache flush, cache bypass and cache freeze can use compiler support to determine the optimal placement of these cache instructions. Compiler support includes: identifying frequently executed loops for freezing in cache; identifying random data accesses for cache bypass to avoid "pollution"; providing memory reference dispersion to minimize intratask cache line collisions in multi-tasking environments; and the control of cache line replacement (rather than by LRU, etc.). The investigation of compiler-aided cache performance enhancements is discussed in detail by Chi in Compiler Driven Cache Management using a State Level Transition Model. PhD thesis, Purdue University, December, 1989. EE 89-71.

Scheduling tasks in real-time systems requires knowledge about task execution times. Current research at the University of Texas at Austin has developed an interactive tool that is used to determine the execution times of code modules which compose a task. Timing analysis of various high level code modules is performed on the assembly level code; Five software modules are used to perform the analysis. Module #1 is an assembly code parser which uses LEX and YACC to translate any processor specific assembly syntax into direct commands to the hardware simulator in module #2. This event driven simulator incorporates techniques for determining any speedups due to implementation dependencies such as pipelines, as well as delays caused by issues such as memory or bus contention. Module #3 is a graph generator which is used to develop directed flow graphs of the program behavior. Each node in the flow graph represents blocks of straight line code separated by arcs which indicate the program flow instructions. This flow graph is then used by the graph analysis algorithms in Module #4 to perform functions such as longest and shortest path determination. The final module is the interface to the user through the SUN workstation, and uses window's to display the graphs, assembly code, and timing data.

The timing analysis is performed interactively through the SUN windowing system. The user points a mouse to any starting (S) and ending (E) point in the flow graph, and requests the minimum and maximum execution times for this subgraph. Legal subgraphs are those that have no arcs entering blocks other than S and E from a block outside the subgraph. The user is asked to input a range estimate for all loop control variables when these variables are run-time dependent values. This type of tool is extremely useful in determining how to best utilize cache partitions, as well as in determining the performance improvements provided by the predictable cache hits.

David Simpson (Real-Time RISC's *Systems Integration*:35–38, July, 1989.) states that "However, because the goal of real-time processing is deterministic, or predictable response times, caches pose a problem: An individual instruction or data reference may or may not be in the cache".

Caches have been bridging the gap between CPU speeds and main memory speeds since they were first introduced in the IBM 360/85 computer in 1969. Their absence in real-time system designs, however, has been noticeable. While the general purpose computing community has very successfully taken advantage of the average case performance speedup provided by cache technology, the real-time community finds minimal benefits in cache designs optimized for average case performance. This optimization criterion has opened a wide gap between the average case performance which is important to general purpose computing and the worst case performance that is critical to real-time computing. The following discussion introduces the SMART (Strategic Memory Allocation for Real-Time) cache design strategy as a solution to narrowing this ever-increasing performance gap.

Ron Wilson (RISC processors overtaking CISC for the next-generation. *Computer Design RISC Supplement*:5–8, August, 1989) states that "A modestly fast CPU could completely saturate the memory bus . . . So. system designers found they had to use instruction caches to keep the CPUs running. Similarly, as CPUs grew faster, the time lost in load and store operations became onerous. To meet this challenge, designers resorted to data caches to keep the chips running. But elaborate caches brought about still more problems . . . they harmed . . . predictability, . . . thereby posing a serious problem to the designers of real-Lime systems".

In the environment of priority-driven, preemptive schedulers, the contents of a cache are virtually random for any task that is subject to preemption. Even the highest priority task is subject to preemption by interrupt routines. As discussed previously, this results from a preempting task overlaying the cache footprint of the preempted task. When the preempted task resumes execution, it incurs an unusually low cache hit rate while it reloads its working set in to the cache. Therefore, the goal of predictable cache designs is to hide the effects of preemptions and interrupts as seen by the preempted task.

Hiding the effects of preemption in a cache can be achieved through one of two mechanisms; protection or restoration. Protecting the cache contents involves implementing a scheme that prevents the preempting task from being able to destroy the information in cache that belongs to the preempted task. The importance lies not with preventing the cache contents from changing, but rather with preventing the cache contents seen by the preempted task from changing. Approaches to cache predictability using protection facilitate the concept of cache partitioning.

Cache restoration policies allow the contents of cache to change during preemptions. However, before the preempted task resumes execution, the cache is reloaded to provide the information resident before preemption occurred. Investigation of such approaches has shown, them extremely inefficient due to the time required to perform the restore, as well as the work required to determine the correct restoration data. Therefore, only partitioning/protection mechanisms are presented David Simpson (Real-Time RISCs. *Systems Integration*( ):35–38, July, 1989.) states that "Conversely, developers can lock portions of code that have to be high speed and deterministic into the cache. Although this approach guarantees high-speed, deterministic responses, the bulk of the code will not benefit from the speed (of the cache) . . .".

One approach to predictable caches is to load the most frequently accessed routines of each task in the cache at IPL (Initial Program Load) time. The cache is never modified once it has been loaded. The routines loaded in the cache are guaranteed to hit on every instruction access and therefore result in predictable execution times. The strategy can also be used in data caches by preloading the data cache with frequently accessed data structures. The cache refill capability is then disabled, preventing cache line replacement. Once again, all references to these data structures provide guaranteed hits. Similar approaches have been implemented in virtual memory machines to maintain the most frequently accessed pages in real memory as a means of reducing memory thrashing.

The locking cache design provides predictable execution limes and is extremely easy to evaluate since the cache contents never change. It does, however, suffer the severe performance drawback that the number of cache hits can be extremely limited. The resulting performance can be very good if the frequencies of some of the tasks in the task set are much higher than others. These tasks then dominate the contents of cache and compete with fewer tasks for cache line ownership. However, as the ratio of task frequencies decreases, the performance drops off rapidly.

Under a dynamic cache allocation scheme, a cache is divided by the hardware design into a predetermined number of partitions. When a task is ready to run, it requests a certain number of these partitions. During its run-time, all memory requests generated by the task are mapped to these partitions. A task which is preempted in the middle of its execution resumes execution with the exact cache partition contents that it had established before being preempted, and therefore experiences no reload-transients due to multitasking. The ELXSI System 6460 uses a dynamic cache allocation scheme. The 6460 has a cache size of I-MByte divided into separate 512-Kbyte Data and Instruction caches. The cache can be further divided into halves, quarters, eighths, or a combination thereof Each partition is then dynamically allocated to one real-time task, and remains dedicated to that task until it finishes running.

While this approach can provide significantly better performance than the simple cache locking technique presented in the previous section, it suffers from two major drawbacks. First, shared data structures can not be kept in cache if internal cache coherence is to be guaranteed. ELXSI addresses this problem by providing a write-around instruction which bypasses cache and writes directly to main memory. Secondly, and most importantly, is that execution times are still not predictable. This phenomenon results from the fact that cache partitions may not be available for allocation to the requesting task. When there are insufficient cache partitions to meet outstanding requests, requesting tasks must wait until enough cache has been released. This results in priority inversion and unpredictable execution times.

The caching strategies discussed in the previous section introduced the techniques and drawbacks of the present day approaches to real-time caching. Through these discussions it is possible to gain insight into the design trade-offs of predictable caching strategies. The ELXSI 6460 taught us that we should provide a means for caching shared data structures without violating internal cache coherence. Partition locking showed us that while simple hardware implementation is desirable, static cache contents should be avoided for performance reasons. In addition, by its inability to handle mode changes, we learned that flexibility in the binding of the strategy to the task set is necessary in environments which may experience variations in the task set. The dynamic cache allocation scheme demonstrated the need to guarantee that cache partitions are available at all times to avoid unexpected delays and priority inversion. Finally, the cache restoration approaches re-emphasized the need for a real-time cache strategy that results in minimum perturbation to context switching times.

The SMART cache design strategy is a software controlled partitioning technique which provides predictable cache performance while requiring minimal hardware costs and resulting in very little overhead during context switching. The implementation of this design scheme within an environment which includes hard deadline periodic tasks, hard deadline aperiodic tasks, soft deadline aperiodic tasks, and shared data structures, is discussed in the following sections.

Figure 4:
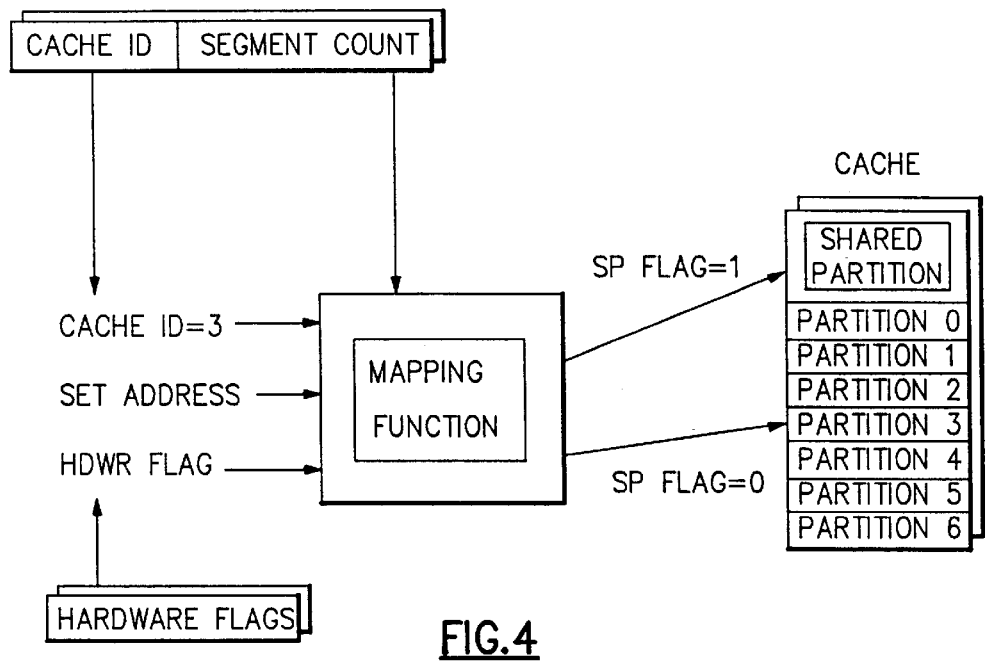
FIG. 4 shows a functional overview of a cache partitioning system in accordance with the inventions.

Under the SMART cache partitioning scheme, a cache of size C is divided into S segments. These segments are then allocated to the N tasks in an active task set, where N may be greater than, equal to, or less than S. The cache is partitioned. so that a portion of the segments are contained in one partition referred to as the shared partition, and the remainder of the segments form the private partitions that are assigned to the performance-critical tasks (see FIG. 4 ). The shared partition services aperiodics, interrupts, and other miscellaneous tasks, as well as providing for coherent caching of shared data structures.

Segments within a private partition can only be accessed by the task that owns it and are consequently protected from preemption-induced cold-starts and their associated low hit rates. The number of cache segments allocated to each periodic task is determined by a procedure presented in detail in Section DPSA.LAB. In addition, private partitions can he allocated to aperiodic tasks to provide improved average response times, and reduced processor utilization.

Each task owning segments in a private partition is also free to use the shared partition to limit collisions within the private partition or to store shared data. Since the shared partition is accessed by multiple tasks, it is not protected across preemptions, and the resulting cache hits are not guaranteed. Therefore, references to the shared partition by tasks which own private partitions should be limited. Systems which employ split data and instruction caches can use the shared instruction partition as a read only memory which stores commonly used library functions. References to this shared partition would then result in predictable cache hits.

Private partitions can also be allocated to a group of tasks if they share the same preemption level (i.e., they are not permitted to preempt one another). The AEGIS Tactical Executive System (ATES) implements such a scheduling scheme (Fred D. Iannon. AN/UYK-43 Standard Executive Survey Report. Technical Report UDI-S-23272C, IBM Corporation, Owego, N.Y. 13827, 1981). ATES supports 64 priority levels, divided into 4 preemption levels. Priorities within a preemption category are used to determine which active task will he serviced at the next task completion boundary. Once a task is running, only tasks in a higher preemption category can cause a context switch. If one partition is used by interrupt routines, one is used for the operating system, and one partition is used for each of the four preemption levels, the entire task set can be serviced by six cache partitions.

The following discussion assumes a set-associative cache, but the same conclusions hold for direct-mapped cache (a comprehensive discussion of the differences appears in Hill (A Case for Direct Mapped Caches. *IEEE Computer* 21(12) :25–40, December, 1988). For ease of presentation, we will also assume a mixed cache, but separate data and instruction caches can implement identical or separate partitioning strategies.

A segment count field and cache ID are used to identify how many segments a task owns, and which they are. A hardware flag determines whether the shared partition or the private partition is active. The cache ID, segment count field, and hardware flag(s) for the active task are loaded during the context swap. During memory accesses, the set address for the cache is combined with the cache ID and the hardware flag(s) as shown in FIG. 5A. Two cases are used to show the difference between owning one cache segment and owning two. Two cache segments require one less bit from the users cache ID (U). The delay in the cache access path due to the additional SMART hardware is minimized by restricting the partition sizes to powers of two cache segments.

Figure 5:
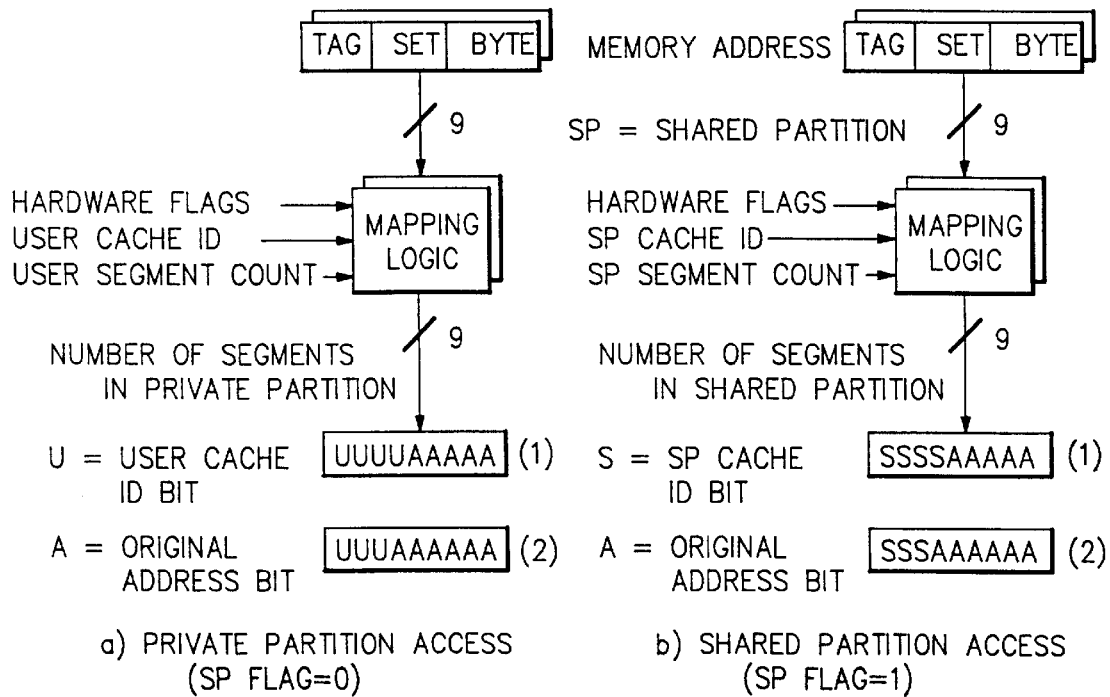
FIG. 5 shows an example of mapping of the cache address in accordance with the inventions.

In a similar manner, the shared partition accesses are generated from the original memory address combined with the shared partition cache ID, and the shared partition segment count field. This mapping is shown in FIG. 5 *b*. Once again, two cases are shown to distinguish between one segment being allocated to the shared partition, and two segments being allocated to the shared partition. The shared partition hardware flag which determines if memory references should be mapped to the private or shared cache partition is toggled by instructions embedded in the execution code either as additional instructions (vertical insertion), or as additional bits in the present instructions (horizontal insertion).

As with any partitioning scheme or multiple cache system, cache coherence must be addressed in the SMART cache design strategy. Cache coherence deals with maintaining the contents of the cache in such a way that valid lines always reflect the latest information available to the memory system. A simple scenario which demonstrates a coherence problem is provided by a system with two processors, two caches, and a shared memory. Each processor has read the same line of information from main memory into its cache. One processor then stores new data at this location.

The cache of this processor (and main memory in the event of a write-through cache) now contains the latest information. However, the second processor's cache still contains the old data. If this line remains valid, the ensuing access will return stale data. Different techniques, such as directory schemes and cache snooping, are used to assure cache coherence in multi-cache systems.

The SMART cache partitioning scheme must ensure internal cache coherence between multiple partitions when data structures are shared. Modification of a shared data structure within the confines of a private partition would prevent other tasks from accessing the most recent data. There are two approaches to solving this problem. The first approach is to enforce a software maintained coherence scheme by which each task is responsible for bounding each access to shared data structures with semaphores. Once a lock has been obtained, the task must flush the shared data lines from the cache before releasing the lock. This type of scheme is sometimes used by virtually addressed caches to eliminate aliasing problems.

A second approach requires that all shared data be cached in the shared partition. This eliminates the possibility of multiple copies of the same data existing in cache, thereby eliminating the risk of any task accessing stale data. For reasons discussed earlier, data accesses to these structures would then help reduce average case execution time but not worst case execution times. To allow instruction access to private cache partitions while data references are being directed to the shared partition, the SMART cache design includes a separate shared partition flag for instructions and data. Cache accesses for data would use the hardware data flag, and cache accesses for instructions would use the hardware instruction flag.

The primary use for the shared partition is for maintaining cache coherence for shared data structures and for servicing non-time critical tasks. With compiler assistance, the shared partition can also be used to avoid displacing useful lines of the private partition with single occurrence memory references. If these references miss, they replace lines in the shared partition rather than the private partition. Finally, the shared partition can also he used to allow tasks which are not allocated a private partition (typically a task with a very long period) an opportunity to access memory without incurring the long delays associated with main memory. The question arises as to how we determine the size of the shared partition.

As mentioned earlier, the number of cache segments owned by the shared partition is restricted to being a power of two. One approach which reduces implementation hardware for SMART partitioning is to give the shared partition exactly half of the available cache segments. By doing this, the shared partition cache ID register, and shared partition segment count registers are no longer needed. Address mapping to the shared partition is then accomplished through the use of the shared partition flag bit. Although this technique minimizes the required hardware, it has a serious impact on the number of cache segments available for private partitions. As mentioned earlier, cache hits in the shared partition reduce the average case execution times but do not contribute to reducing the worst case execution times.

On the opposite side of the spectrum, the shared partition could consist of as little as one segment. Systems dominated by time critical tasks and relatively low shared data access rates would make more efficient use of the cache segments for servicing time critical tasks. However, some systems with few time critical tasks would benefit more from allocating the majority of the cache segments to the shared partition.

Figure 6:
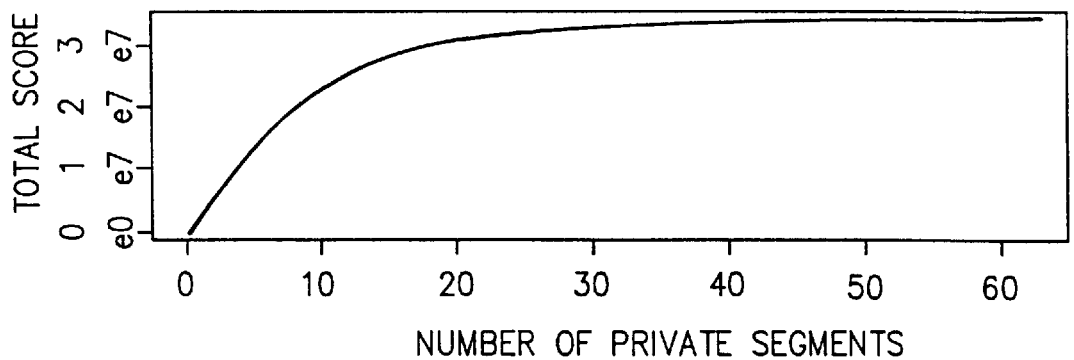
FIG. 6 is a graph-showing how cache performance varies with the size of shared partitions.

Between these two extremes is an allocation procedure which is dependent on the criticality of response times and the performance improvements provided by the private partitions. The dynamic programming allocation algorithm presented in Section DPSA.LAB evaluates the total value to the system for assigning anywhere from 1 to S segments to private partitions. An example of the resulting score is plotted in FIG. 6. Although only an example, the shape of the curve is fairly invariant across task sets. Thus we see that as segments are allocated to tasks, there is initially a very large performance gain. However, the gain levels off fairly quickly. At this point, there are only marginal gains associated with allocating additional segments to the private partitions. It is often more effective to allocate the remaining cache segments to the shared partition.

Figure 7:
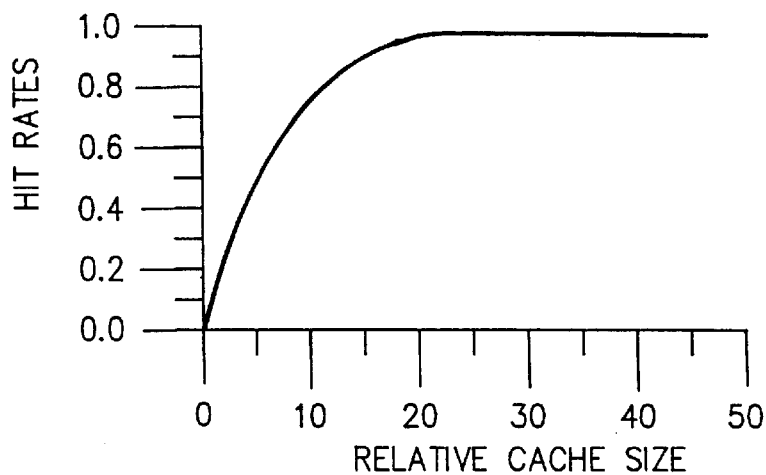
FIG. 7 is a graph showing the diminishing returns of increasing cache size.

Research by Smith, (Cache memories, *ACM Computing Surveys,* 14(3):473–530, September, 1982.) and So and Rechtschaffen (Cache Operations by MRU Change. *IEEE Transactions on Computers* 37(6):700–709, June, 19) has shown that increasing the cache size improves the cache hit rate. However, as may he expected, the magnitude of this improvement decreases as the cache size gets larger. This is shown graphically by the changing slope in FIG. 7. The hit rate initially rises quickly with increasing cache size, but eventually tapers off and is bounded by 1.0.

The effect of the SMART cache design strategy is to reduce the size of the cache available to the applications in the real-time task set. Therefore, the logically smaller SMART caches provide better hit rate improvement from increasing the cache size than the larger conventional cache. In other words, if we consider the graph in FIG. 7, SMART cache partitioning will move the effective cache size further to the left. As a result, changes in the cache size provide a sharper rise in the hit rate. As current technology allows increasingly larger cache sizes (most new microprocessors support cache sizes larger than 1 MByte), the benefit to the SMART cache design approach is significantly better than that for the conventional cache. A cache of size 16 KBytes was increased to 128 KBytes and provided a 16% performance improvement in the SMART cache while the conventional cache experienced a 9% improvement.

Other cache parameters (such as line size, associativity, replacement policy, write policy, and etc.) remain unchanged under the SMART cache design strategy. As a result, the effects of altering any of these cache parameters (i.e. changing the line size from 16 bytes to 32 bytes) for a SMART cache provides identical results as those for a conventional cache. The effects of altering these parameters are discussed in great detail by Smith. Smith discusses the program characteristics that effect each cache parameter decision. For example, large line sizes are beneficial for address traces with high spatial locality (especially on machines which do not have to wait for the entire line before continuing execution). On the other hand, small line sizes are more beneficial for program traces with high temporal locality (especially on machines which have to wait for the entire cache line before continuing execution). Smith provides a graphical analysis of the effects on the cache miss rate from varying the line size parameter. However, he is quick to note that the effects on the cache miss rate do not tell the entire story. Altering the cache line size results in different delays from main memory on a miss, and possibly different cache access times. Therefore, the final analysis is both application and machine dependent. In a similar manner, Smith presents results of altering the associativity of the cache, varying the replacement policy and changing the write-policy. These observations also hold true for SMART caching.

Hill (A Case for Direct Mapped Caches. *IEEE Computer* 21(12):25–40, December 1988) presented a similar discussion focusing on cache associativity in. Hill discusses the need for considering more than cache miss rates when evaluating alternative associativity policies. The effects of cache access times can vary greatly as a result of the time spent performing the comparisons necessary in highly associative caches. Furthermore, additional time is required during the cache access to modify the replacement status, and during the cache refills to resolve the replacement position. Again, the benefits of associative verses direct-mapped caching can not be determined simply by measuring the miss rate.

These, and other studies on the effects of altering cache parameters are directly applicable to SMART caches as well. The SMART cache policy has not changed the cache behavior, but rather, it has changed the size of the cache seen by the application. For example, suppose a task is allocated a 16 KByte cache partition under a SMART cache design. The effects of varying cache parameters will be no different than those resulting from altering the cache parameters in a 16 KByte cache. For this reason, this research does not evaluate the effects of altering these parameters, but rather focuses on evaluating and demonstrating predictable cache execution behavior. Cache parameters were selected to be representative of typical cache designs in current processors. The cache sizes were selected to correspond closely to the size of the working sets of the tasks simulated. The reader is directed to for the discussion of altering cache parameters. Mode changes usually involve a change in the state of the current task set This change can range from a completely new set of tasks, to activation of a few new tasks, to a simple shift in the priorities of existing tasks.

The software based partitioning scheme introduced by SMART cache designs permit the real-time system to react to the task set changes which result from mode changes. The hardware used for SMART partitioning only provides the ability to have a partitioned cache. The boundaries and ownership rights are completely controlled by software. The cache ID register and segment count register are loaded for the running task during the context switch. As a result, if certain information about each task is made available at run time, alterations to the cache partition boundaries can be made in response to mode changes. Once the new allocation scheme has been determined, the new cache ID and segment count for each task replace the original ID and count fields and are loaded in the hardware registers the next time the task enters the running mode.

As discussed by So (Cache Operations by MRU Change. *IEEE Transactions on Computers* 37(6):700–709, June 1988), 16K caches often provide hit rates above 90%, while 4K caches typically achieve hit rates approaching 90% for a range of program traces including database management, scientific applications, and batch jobs. In addition, Kirk and So have shown that caches as small as 256 words typically achieve hit rates of 75%. The impact of caches in real-time applications was tested using a MIPS R3000 and the CSALI (Core Set of Assembly Language Instructions) benchmarks. These benchmarks were developed to evaluate the USAF RH-32 (Radiation Hardened 32-bit) processor. The suite of eighteen routines, which range from implementing a Kalman filter to performing a shell sort, were first run with no cache and then with an 8K data/8K instruction cache with 4 word block refill. Small cache sizes were used to compensate for the small working sets of these routines. Our research thus far has shown this type of program behavior and potential speedup to be characteristic of real-time systems. The simulator measured an average speedup of 5.45, which corresponds to a utilization reduction of 82% over the non-cached implementation, thus substantiating the significant performance gains possible with a cache.

To clarify this performance gain, consider the following example of SMART caching. Assume a processor has a 64K cache which is partitioned evenly among 8 tasks. Each task would own 8K of predictable cache. Consider a task which requires the execution of 2000 instructions with an average of 0.2 data fetches per instruction. In addition, assume that the task is running on a pipelined RISC processor with a cache that cycles at the speed of the CPU and with a main memory with a latency of 4 cycles. Assume that the task has conservative hit rates of 75% for data and instruction references. If the cache is disabled and memory operations overlap instruction execution, the required number of cycles is:

Disabled Cache
Instruction (I) or Data (D) Cache Miss = 3 stall cycles

20(X) I-Fetch * I cycles/instr execution +
2000 I-Fetch * 3 stall cycles/instr miss +
400 D-Fetch * 0 cycles/D-Fetch (hidden by pipe) +
400 D-Fetch * 3 stall cycles/data miss
Total 9200 cycles.

If the cache is then enabled and provides a guaranteed 75% hit rate, the required number of cycles is:

Enabled Cache
Instruction (I) or Data (D) Miss = 3 stall cycles

2000 I-Fetch × I cycle/instr execution +
2000 I-Fetch × 0.25 miss/I-Fetch × 3 stall cycles/instr miss +
400 D-Fetch × 0 cycles/D-Fetch (hidden by pipe) +
400 D-Fetch × 0.25 miss/D-Fetch × 3 stall cycles/data miss
Total 3800 cycles.

The resulting 59% improvement in task utilization will obviously differ with main memory, bus, and each implementation. However, the task execution times arc guaranteed and can be used directly to increase the schedulability of a specific task set by adding other periodic tasks, or increasing the functionality of the current tasks. Although this example did not utilize the shared partition, hits occurring in the shared partition result in a reduction in execution time as well. The resulting time savings from these hits can then be used to reduce the response times for aperiodic tasks.

Previously, we discussed an algorithm for allocating cache segments to periodic tasks. We now consider techniques for allocating cache segments to aperiodic tasks. Aperiodic tasks are typically characterized by random arrival times and soft deadlines. However, some aperiodic tasks are specified with hard deadlines. The use of SMART cache partitioning introduces the question of how to handle aperiodics. Allocation strategies fall into two basic categories. The first category uses the shared partition to service aperiodic tasks. This approach maximums the number of cache segments available for periodic tasks, but may provide poor average case response times for the aperiodic. The second category allocates a private partition to the aperiodic task (or group of tasks). This approach may improve the aperiodic task response times, but reduces the amount of cache available to the periodic tasks. The requirements of the specific aperiodic task and the host system must ultimately decide which approach is best.

The first approach, which requires the aperiodic task to use the shared partition, results in average case response times which vary with the task preemptions. This results from the effects of cache reload transients when tasks share cache in a preemptive scheduling environment. For many aperiodic tasks, such as those with soft deadlines or low semantic importance the resulting average case response time may still be acceptable. Memory operations for aperiodics in using the shared partition would assume the delay associated with accessing main memory. Determining the actual average case response times would require simulation similar to the technique discussed earlier for periodic tasks. These response times would vary with the size of the shared partition.

In the event that an aperiodic server (i.e. sporadic server) is to be used, both the aperiodic task and the server would use the shared partition. It is also possible to allow the aperiodic server to service tasks using the shared partition, as well as tasks using private partitions. This is determined by the cache IDs assigned to the individual tasks.

The second approach which allows the aperiodic task to use a private partition, results in average case response times which do not vary when other tasks modify the cache contents. This approach is useful for hard deadline aperiodics and aperiodics with high semantic importance. Allocation of the private partition to an aperiodic task can be accomplished by using the average interarrival time as its period. The task then competes for cache segments with periodic tasks. If this approach results in unacceptable response times, the task must be dedicated a larger number of cache segments. Determining the required number of segments is accomplished by execution of the task in the different legal partition sizes. The response time will decrease monotonically with increasing cache size. Once the number of cache segments required for a specific execution time is determined, the segments are dedicated to this task and removed from the cache segments available to the periodic tasks.

An aperiodic server can be used with the private partition by assigning identical cache IDs to each of the aperiodic tasks and the server. This allows these tasks to access a private partition, while avoiding the need for a separate partition for each aperiodic task. This provides predictable response times if the aperiodic tasks can not preempt one another, and functions similar to a shared partition when they can preempt one another. Determination of the private partition size is accomplished by simulation of the aperiodic tasks in all the legal cache partition sizes. The designer must understand what response times are acceptable to the system. The smallest cache partition size resulting in acceptable response times is then selected.

The SMART cache strategy is easily implemented on most cache designs. This includes set associative caches as well as direct mapped caches, physically indexed as well as virtually indexed caches, write-through as well as copy-back caches, and single level caches as well as multi-level caches. The following section describes the MIPS Rx000 processor, and discusses the design support required to implement SMART caching on the R3000.

The MIPS Rx000 RISC (Reduced Instruction Set Computer) is a commercially available product based on the MIPS research project at Stanford University. The Rx000 family provides all the standard RISC features including: load/store architecture; delayed load instructions; delayed branch instructions; simple addressing mode; single-cycle instruction execution; simple instruction format (always 32-bits); and a reduced instruction set. In addition, the Rx000 family includes: support for hierarchical memory design; support for separate data and instruction caches; a memory management unit (on-chip TLB); support for write buffering; multiply/divide hardware; and a User/Kernel protection mechanism.

The load/store architecture eliminates the delays associated with instructions that must calculate addresses to go to memory. By mandating that all operations be performed on operands resident in processor registers, the Rx000 can provide single cycle pipelined instruction execution. Those instructions which do access memory are compensated for through the use of delayed load instructions (which allow the execution of an instruction while the load is occurring), delayed branch instructions (which allow the execution of an instruction while the new instruction is being fetched), and write buffering (which allows the processor to continue executing instructions while the write is performed to memory).

Figure 8:
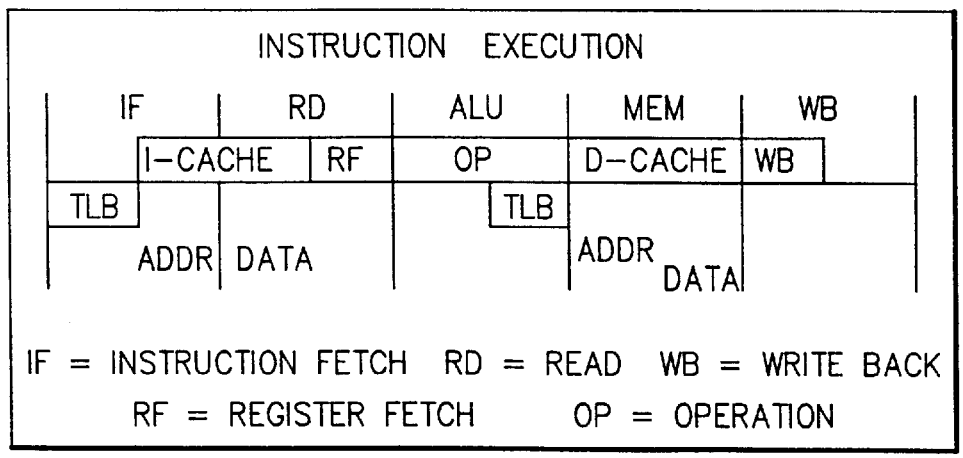
FIG. 8 shows a prior art MIPS R3000 instruction pipeline.

The simple instruction format, simple addressing modes, and reduced instruction set all contribute to the case of implementation of a 5-stage instruction pipeline which allows single-cycle execution. The architecture supports only three instruction formats, all of which are 32 bits. This feature provides simplified instruction decoding in the pipeline. Those instructions which require a memory address (load, store and branch) use the only address mode available in the Rx000 base register with 16-bit offset. Once again, this simplifies the pipeline hardware for calculating operand addresses. The reduced instruction set includes support for: load/store instructions; computational (arithmetic, logical and shift) instructions; jump and branch instructions; coprocessor instructions; and special instructions (such as syscall and breakpoint). The elimination of multi-cycle complex instructions eases the execution phase of the instruction pipeline. The resulting instruction pipeline is shown in FIG. 8.

The on-chip memory management unit provides a 64 entry fully-associative translation lookaside buffer (TLB), as well as the instructions necessary for examining and controlling it. Each entry in the TLB maps a 4K page, provides read/write access, cache control flags, and a process identifier field. In FIG. 8, the TLB access is shown during two stages of the instruction pipeline. The first access occurs in the fetch of the 32-bit instruction. The second TLB access only occurs when the instruction requires a data access to memory (i.e. load/store).

During the IF pipe stage, the virtual instruction address is mapped to a physical address (in the ThB) and presented to the I-Cache. The instruction is read into the processor at the beginning of the RD pipe stage during which decoding takes place, and the required registers are accessed. During phase one of the ALU pipe stage, the computation is performed (i.e. add base register to 16-bit offset). Load and store instructions access the TLB for a data address during phase two of the ALU pipe stage. The MEM pipe stage is used to access the D-Cache for Load/Store operations, and the ALU or Load data is stored in the registers during the WB pipe stage.

The MIPS R3000 RISC provides support for hierarchical memory design to provide the high memory bandwidth necessary to run without pipeline stalls. High-speed cache placed between the CPU and main memory allows single-cycle memory access when there is a cache hit. In addition, the R3000 supports separate instruction and data caches, thereby essentially doubling the cache bandwidth. The R3000 alternates accesses to these two caches during each processor cycle. Each cycle is composed of two phases. During phase 1, the data address appears on the address bus, and the data is driven out during phase 2. The instruction address appears on the address bus during phase 2, and the data is driven out during phase 1 of the next CPU cycle. This pipelined approach provides data from each cache during one cycle.

Figure 9:
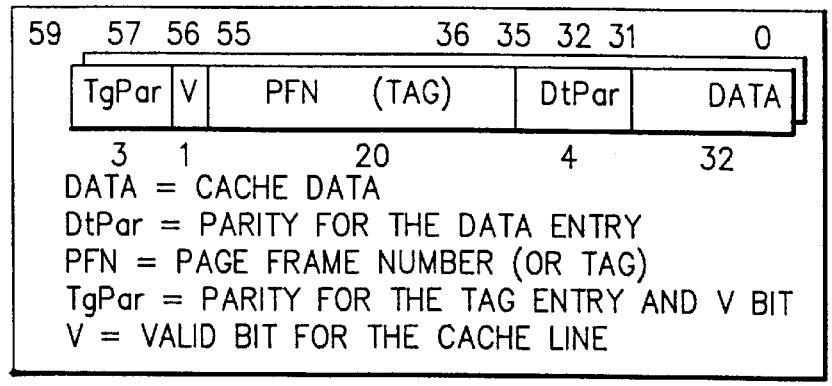
FIG. 9 shows the MIPS R3000 cacheline format.

The instruction and data caches are both implemented with a 32-bit line size and a 21-bit tag. The 21-bit tag is composed of a single valid bit and a 20-bit page frame number. Parity is provided across both the data and the tag field. The resulting cache line is shown in FIG. 9. Because the cache is addressed using the lower 18 bits of the memory address, the largest cache supported is 256 KBytes. The 20-bit page frame number requires the cache be no smaller than 4 KBytes. Hence, the R3000 supports data and instruction caches of size 4K–256K bytes each.

Figure 10:
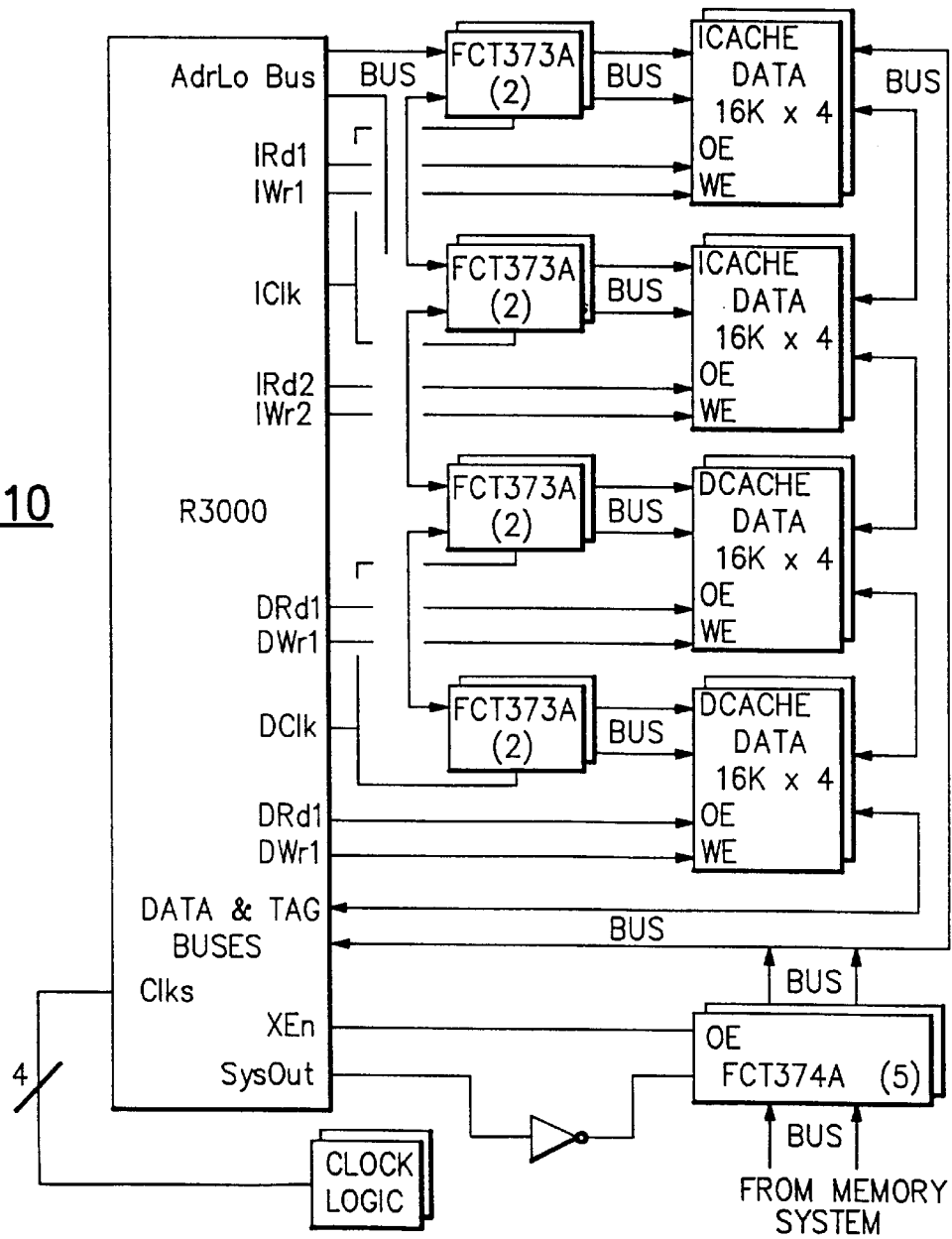
FIG. 10 shows the MIPS R3000 prior art original cache design.

A typical R3000 Cache Design is shown in FIG. 10 as reproduced from LSI. During phase 2 of cycle 1, the low order 18 bits of the instruction address appear on the address bus and are latched in the transparent latches (FCT373A's). This address is used to simultaneously access the I-Cache data and tag RAMs. During phase 1 of the following cycle, the data and tag from the I-Cache are driven on the Data and Tag busses. The tag is then internally compared with the page frame number returned by the TLB to determine if a hit has occurred.

In the event of a hit, the pipeline continues in the normal fashion. However, if a tag miscompare occurs, the pipeline must stall. During phase 2 of the cycle that resulted in the miscompare, the data and tag busses are driven by the D-Cache in the normal manner (or can be at high impedance if no data operation is taking place). The processor then switches from Run mode to Stall mode while it starts a main memory access. It presents the main memory address on the AdrLo and Tag busses and maintains this information until the memory indicates that it is ready by de-asserting the RdBusy line. The processor then switches to the Fixup mode during which it enables the memory interface to drive the Data bus. It is during the Fixup cycle that the new data and tag are written to the I-Cache Data and Tag banks. The Fixup cycle repeats the cycle which led to the original cache miss. During the following cycle, the processor switches back to Run mode. During cache misses, the R3000 also supports block refill and instruction streaming.

A cache line size of one word (such as that supported by the R3000) can significantly reduce the cache benefits resulting from spatial locality since every miss would result in fetching only the target address from main memory. To compensate for this, the R3000 also supports multiple word transfers from memory (or block refill). On single word transfers, the delay is (S+1) cycles (where S is the number of stall cycles). Therefore, if n consecutive words miss in cache, the resulting delay would be n*(S+1)=(nS+n) cycles. Block transfer allows this delay to be reduced to (S+n+1) cycles by stalling S cycles and then providing one word every cycle thereafter for n cycles. In this manner, n words of cache are updated as a result of a single miss, thereby mimicking the effects of a multi-word cache line.

Regardless of which word in the block (0–[n−1]) actually caused the miss, the 0th word is always fetched from main memory first. The entire block is then transferred to cache. Upon completion, the Fixup cycle is then executed and the processor returns to the Run mode. The R3000 supports block refill for both instructions and data.

. . . there's no need to wait until all 32 words are fetched from main memory; the processor starts executing instructions as soon as the first word is fed to the cache (Ashis Kahn, MIPS RISC: an overview of the architecture. *Computer Design RISC Supplement*:12–13, August, 1989).

In addition to providing support for block cache refills, the R3000 also supports run refill or streaming. When streaming is enabled, the processor will re-enter the Run mode while the remainder of the cache block is being refilled Instruction execution resumes when the instruction which originally caused the miss is loaded in the cache. Once again, if we assume that the next n instructions were all going to miss in the instruction cache, the total delay would be (nS+n) for no block refill and (S+n+1) cycles for block refill. If instruction streaming is enabled and we assume the first word of the block caused the miss, the total delay is reduced to (S+I). Similarly, if the second word in the block had caused the original, miss, the delay would be (S+1+1). Therefore, the total delay with streaming enabled is (S+m+1) where (m <n) and m is the word index of the original miss (i.e. 0–[n−1]).

The R3000 supports streaming for the instruction cache only. Detailed diagrams of block refills, streaming, aborted streaming, and retries are provided in LSI.

FIG. 11 shows the functional blocks necessary to implement the SMART cache design strategy with an R3000 processor. The primary logical components depicted include: a Private Partition Cache-ID Register (PPCIDR); a Private Partition Size Register (PPSR); a Shared Partition Cache-ID Register (SPCIDR): a Shared Partition Size Register (SPSR), and a Flag Register which contains the necessary hardware flags. The active task uses the PPCIDR to map addresses to it's private partition. The PPSR determines how many address bits need to be mapped when the private partition is being accessed. The SPCIDR maps addresses from any task to the shared cache partition. The SPSR determines how many address bits must be mapped when the shared partition is being accessed. These registers can only be modified from the Kernel mode.

Three flags are used during the mapping operation. The Non-Real-Time (NRT) flag is used to bypass the SMART partition scheme and is useful for debug and diagnostic modes. It can also be set when predictable caching is not required. This flag can only be altered while in Kernel mode, which prevents a task from inadvertently destroying the private partitions of other tasks. A second flag, the Private Partitions Permission (PPP) flag, is also controlled from Kernel mode. It indicates that the task has been allocated a private partition in cache. When this flag is set, the PPCIDR and PPSR registers may be used for mapping; otherwise, only the SPCIDR and SPSR may be used. The third flag, which is the only flag under User control, is the Private Partition Selected (PPS) flag, which determines whether an active task wants to access its private partition or the shared partition. In the event that the task does not own any private cache, the flag is disabled by the PPP flag controlled by the Executive (or Operating System) in Kernel mode.

The contents of the cache-ID registers, the size registers, and the flags are controlled by memory mapped operations. Since it is highly unlikely that the entire 4 GigaByte memory space will be physically implemented, the upper address bits (which appear on the Tag bus) can be used to control the loading of these registers. Protection mechanisms can be implemented through the virtual to physical address translation either by using kseg2, which is only available in Kernel mode, or through the TLB access rights that are controlled by the executive (or operating system).

Figure 12:
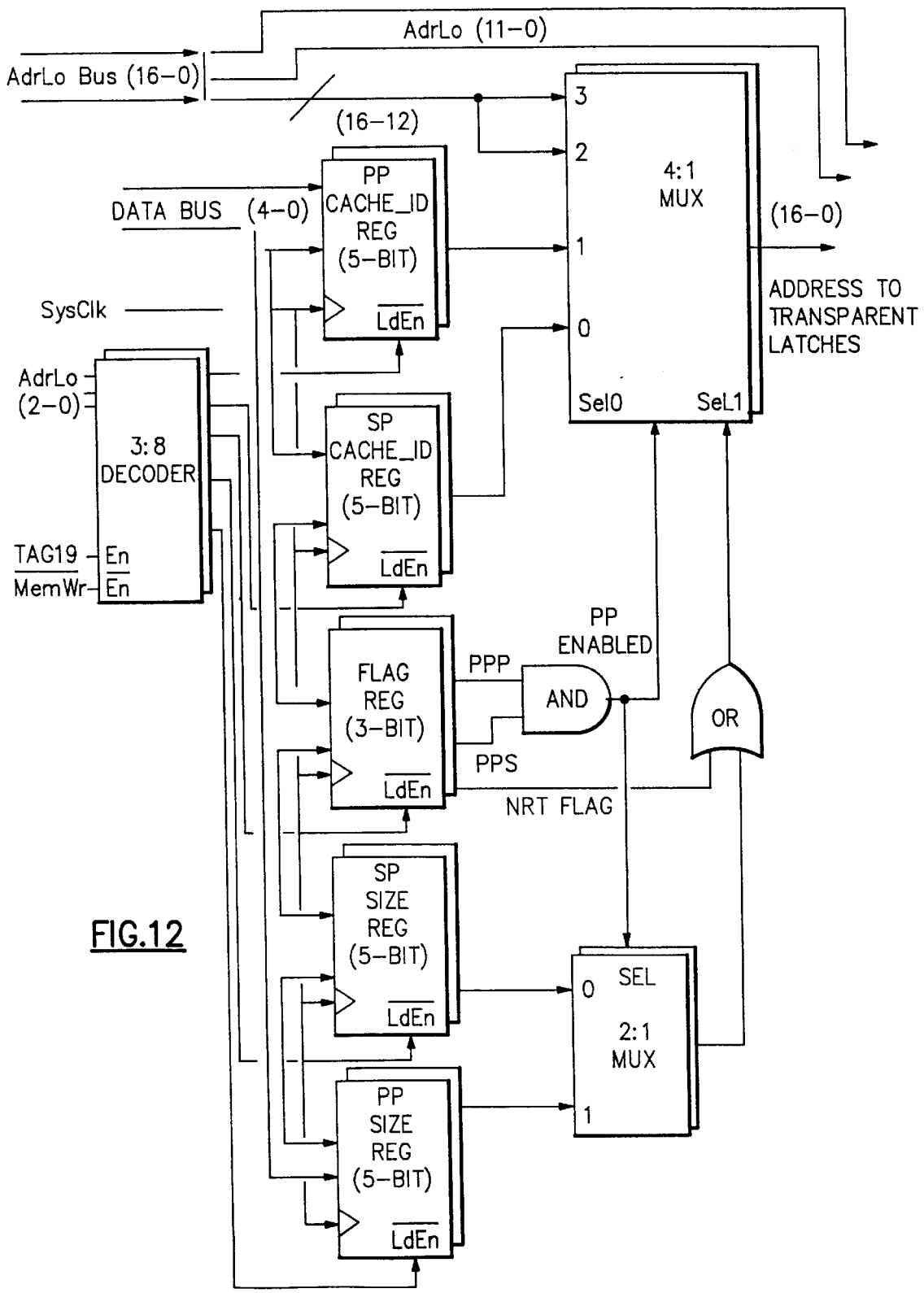
FIG. 12 shows a more detailed lower level schematic illustration of the additional elements used in accordance with my inventions.

The AdrLo Bus in FIGS. 11 and 12 represents the least significant 18 bits of the address. A certain number of these bits will be passed directly to the cache RAM (the LSBs) while others will pass through the SMART mapping logic. If the cache is smaller than 256 KBytes, some number of the AdrLo bits will be unused (the MSBs). Determining which address bits fall into which category is done based on the actual cache size, the number of SMART cache segments, and the size of the SMART cache segments. If the original cache size is $2^m$ bytes, then (18 -m) MSB AdrLo bits are unused by the cache. If the SMART cache segments are $2^n$ bytes, then n LSB AdrLo bits are passed directly to the cache RAM, and (m−n) AdrLo bits are passed through the SMART mapping logic. The remainder of this section presents a specific design example and discusses the hardware requirements as well as the resulting performance impact of this new hardware.

For ease of demonstration, we will only consider the instruction cache in this example. Assume the original cache size is 128 KBytes. Since the cache is only $2^{17}$ bytes, the MSB of AdrLo is unused (as discussed above). The next goal is determining the size and number of SMART cache segments.

It is important to note that when we direct (m−n) AdrLo bits through the SMART mapping logic, all of these bits may be overlaid by the contents of one of the cache-ID registers. This smaller cache window requires additional tag checking. If (m−n) AdrLo bits are overlaid by the cache-ID, then (m−n) bits of AdrLo must be added to ale tag compare. This is easily understood if we look at the overall picture. Originally, we were mapping a $2^{32}$ byte main memory space to a direct-mapped cache of size $2^n$, and we required a tag of (32-m) bits. Now, for a task that only owns one cache segment we are mapping a $2^{32}$ main memory space to a cache of size $2_n$ where n≦m. For a proper tag comparison, this requires (32−n) tag bits, which is (m−n) bits larger than the original tag.

The MIPS R3000 architecture defines a 20-bit tag field (address bits 31–12) and an 18-bit AdrLo field (address bits 17–0) Therefore, there is already a 6-bit overlap (bits 17–12), which implies we could redirect as many as 6 of the AdrLo bits to the SMART mapping logic and still have a valid tag comparison. However, since we are only using the 17 LSBs of the AdrLo bus to access our 128 KByte cache, we are left with a 5-bit overlap. Therefore, if we select m=17, and (m−n)=5, we know that n=12, and the size of our cache segments are 4 KBytes. The smallest private partition available is therefore 4 KBytes, and there are 128/4=32 segments available for allocation.

The resulting design is shown in FIG. 12. AdrLo bits 16–12 are redirected through the SMART cache logic. Each multiplexer is controlled by 2 bits. One select bit (SI) indicates whether the AdrLo or the cache-ID bits should be used. This selection is based on the NRT flag and the size of the partition corresponding to the appropriate cache-ID being used (private or shared). If the NRT flag is set, the AdrLo bits are always selected. If the NRT is reset, the AdrLo bits are only selected if the bit in the size register, corresponding to the address bit being mapped, is set. For example, if the size register LSB (bit 0) is set, then AdrLo bit 12 is selected, since this is the least significant AdrLo bit being redirected through the SMART mapping logic. Likewise, if the size register bit 1 is set, AdrLo bit 13 is selected. However, if the size register bit 1 is reset, the cache-ID bit is selected instead. As a general rule, the smaller the size register value, the smaller the number of AdrLo bits that get passed directly through the mapping logic. The other select bit (S0) is used to select the PPCIDR or the SPCIDR depending on whether or not private partitioning is permitted and selected.

Continuing the above example with a 128 KByte instruction cache, let us now consider how a specific task set might use this cache partitioning. Assume that the task set consists of 10 periodic tasks, an executive, and an interrupt service routine, all competing for system resources. These tasks are scheduled by a preemptive priority-driven scheduler, such as the rate-monotonic algorithm. An analysis is performed to determine the hit-rate sensitivity of each task's address trace as a function of its cache allocation. This is similar to determining the size of the working set for the task. This hit-rate is then weighted by the number of memory references and the frequency of the task to produce an expected number of hits per unit time. The cache is then allocated in such a way that the total number of hits per unit time is maximized, thereby minimizing the overall system utilization. Checks are performed to ensure that the resulting task set is schedulable. Other weighting factors, such as semantic importance, can be added if desired.

An example of the resulting allocation is shown in FIG. 13. Each task has been allocated a certain number of 4 KB yet cache segments with the exception of the executive, the interrupt routine, and two tasks which will only use the shared partition. The private partition cache-ID and size information are stored in the Process Control Block (PCB) for each task. When a task gains control of the processor, the executive loads the partition registers to indicate the cache rights of this task. For example, if we let a represent a bit of the AdrLo bus, then when $Task_1$, is executing the 17 AdrLo bits will always map to (1 00aa aaaa aaaa aaaa→16 KBytes available) as long as the private partition is selected. In the event that the shared partition is selected, the 17 AdrLo bits will map to (0 0aaa aaaa aaaa aaaa→32 KBytes available). If $Task_7$ were running and the private partition was selected, the 17 AdrLo bits would map to (1 1111 aaaa aaaa aaaa→4 KBytes available).

If we assume that Task, is running and it is preempted by $Task_1$, the only additional state information that must be stored in the PCB during context switching is the present state of the PPS flag. This can be accomplished by performing a memory mapped read operation or by requiring each task to keep a softcopy of the flag. It should be noted, however, that if a softcopy is maintained, it should always be modified immediately before the register is modified. This way, if the task is preempted between the two operations, the executive will restore the flag to the correct state when the task is restarted. Another alternative eliminates this hardware flag by using virtual memory mapping to control the access to the shared partition, as shown in FIG. 14. All references to data or instructions placed in the shared partition arc then mapped to a different 4K memory page. The TLB translation could then specify that this reference is to the shared partition. This is accomplished in the hardware by issuing a physical address which is higher than the physical memory implemented. The unused address bit replaces the PPS flag shown in FIG. 12.

Any active task can toggle cache operation between its private partition and the shared partition by writing to a specified address (which is translated to an uncached write operation with the upper tag bits set). This write operation has no effect if the PPP flag has not been set by the executive.

The SMART cache design policy inserts hardware in the critical timing path of the cache access. For this reason, complicated address manipulations, such as hashing functions, have been reduced to simplify the multiplexing operation. This implementation consideration requires that a task always own a number of segments which is a power of two. Allocation of cache segments in groups that are not powers of two would require more complicated address hashing, resulting in added timing delays along the cache access path.

Figure 15:
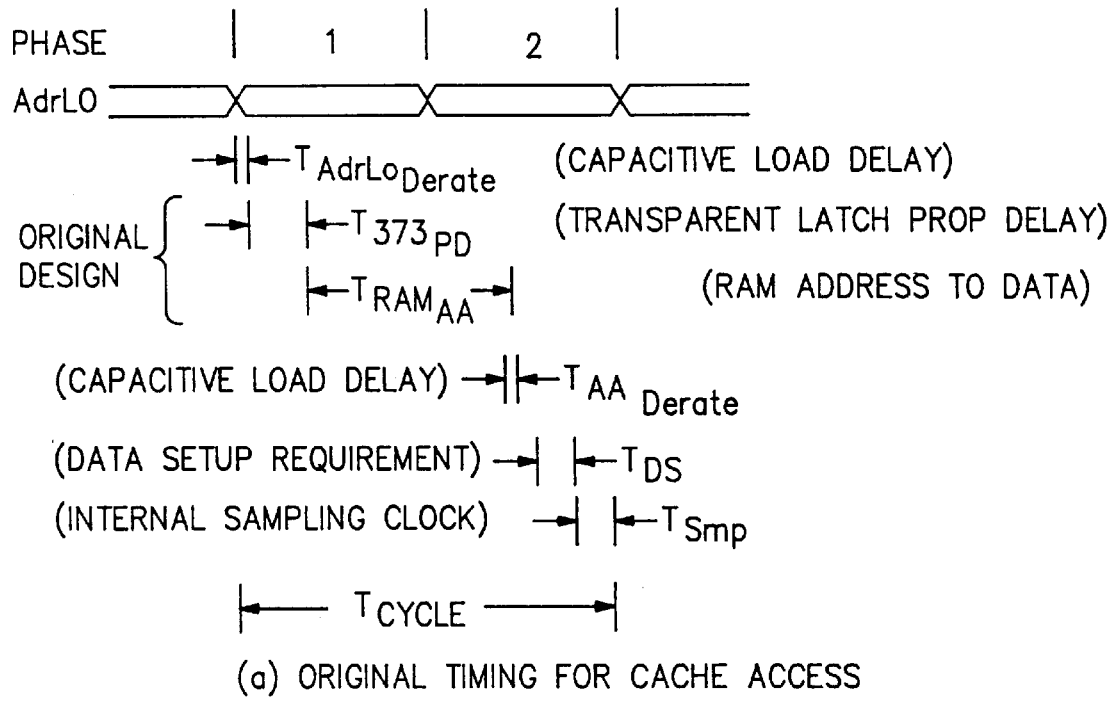
FIG. 15 shows a comparison of the original timing diagram of the MIPS cache access before and after implementation of the invention in such a traditional system for which my inventions are applicable.
Figure 15:
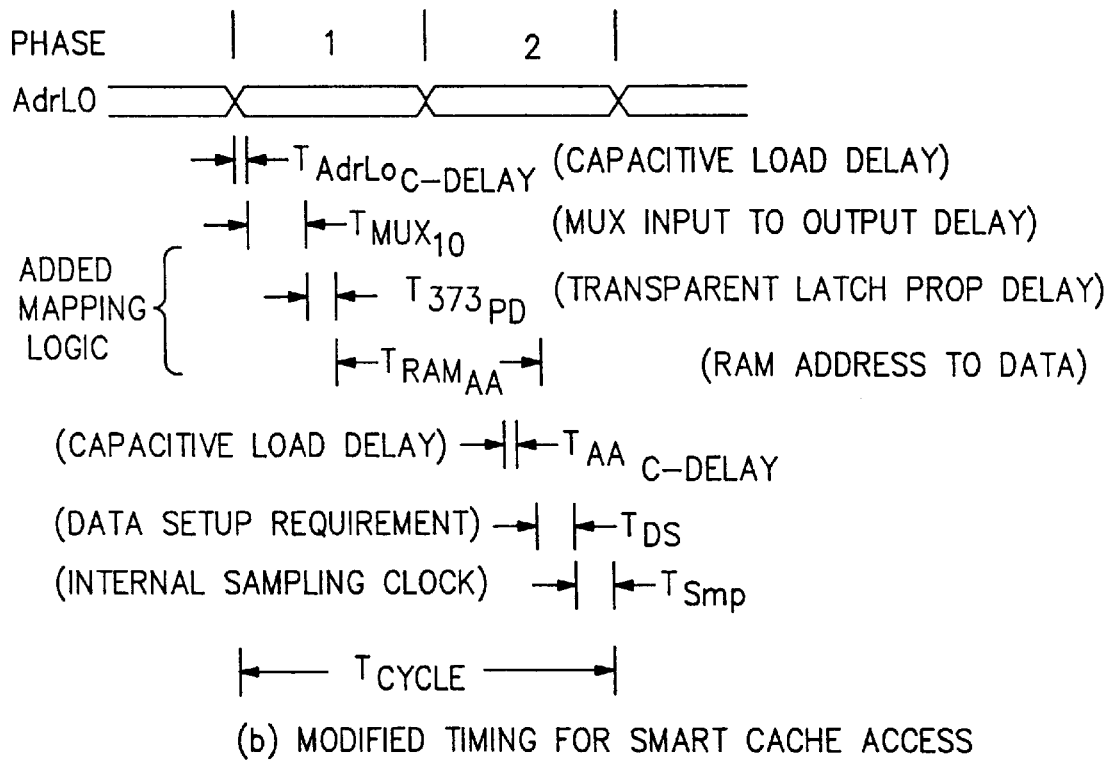

FIG. 12 shows that the delay introduced in the cache access path is due to the multiplexer. However, since all the controls to the multiplexer are stable long before the cache access, the delay is the propagation time from the multiplexer input to its output. If we assume the delay is 6 nsec (FCTIC parts) and we have a 16.67 MHZ R3000, this delay can easily be circumvented by replacing the 25 nsec RAM chips with 19 nsec RAM chips. Similarly, the 20 nsec 16K×4 RAM chips used in the 25 MHZ design could be replaced by 12–15 nsec RAM chips, or even the 10 nsec 16K×4 SRAMs (CY7C1'66-10) chips. The timing diagram shown in FIG. 15 shows the original cache access timing and the timing changes due to the SMART cache mapping logic.

In the event that the cache RAM speeds can not be increased to compensate for the increase in the cache access timing, the cycle time must be increased by the delay time through the multiplexer. If we assume a 25 MHZ R3000, this results in a 15% cycle time degradation. If we then assume a 4:1 main memory to cache access ratio, the break even point is represented by:

$$(1-y)*160 + 40y = (1-x)*160 + 46y$$

where y is the guaranteed hit rate without SMART partitioning (often assumed to be 0% or extremely low), and x is the hit rate guaranteed by SMART cache partitioning. Solving this equation shows that if x is more than 5% better than y, the SMART partitioning is beneficial. Furthermore, if the ratio of main memory to cache memory access is 5:1, the break even point is approximately 4%. Even when the cycle time of the processor must be slowed down due to the SMART mapping logic, the delays are quickly compensated for by a decrease in predictable utilization.

In this chapter we introduced the SMART (Strategic Memory Allocation for Real-Time) cache design strategy. SMART caching results in predictable execution times which are significantly better than the worst case times associated with main memory based systems or other predictable caching strategies. Unlike other real-time cache techniques, such as cache locking/freezing, the SMART cache design allows the contents of cache to change with dynamic program requirements. As a result, SMART caching results in performance levels very close to those of a conventional cache design, thereby narrowing the gap between average and worst case execution times.

A design example using the MIPs R3000 processor was used to demonstrate the hardware requirements of implementing the SMART cache design. A summary of the R3000 memory interface is provided. The necessary additions, alterations, and functions were then presented. An interface timing analysis was performed, and the impact on the cache access delay path was discussed. Alternative components were suggested which entirely hide any delays introduced by the SMART hardware.

Figure 16:
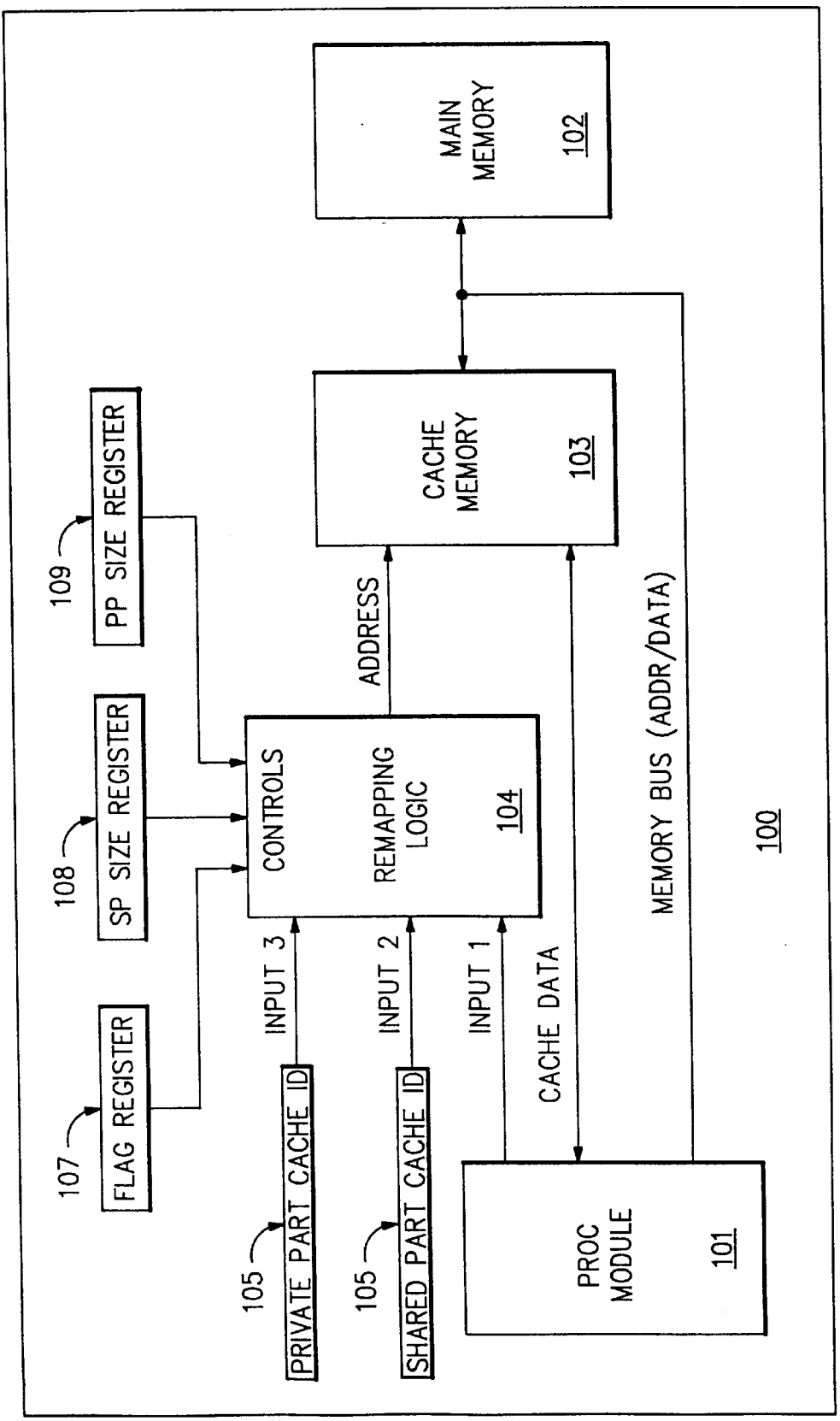
FIG. 16 shows schematically a computer system having a predictable cache for real-time systems in accordance with my inventions.

FIG. 16 illustrates the preferred computer system 100 having a processor unit 101, a main memory 102 and a cache memory buffer 103 with remapping logic 104 for remapping the cache memory buffer, and a plurality of registers 105, 106, 107, 105 and 109 for containing remapping information and access busses between the processor, cache and main memory. With this environment the cache memory buffer is divided into segments, and the segments are one or more-cache lines allocated to a task to form a partition, so as to make available (if a size is set above zero) of a shared partition and a group of private partitions. Registers include the functions of count registers which contain count information for the number of cache segments in a specific partition, a flag register, and two register which act as cache identification number registers. The flag register has bits acting as a flag, which bits include a non-real time flag which allows operation without the partition system, a private partition permitted flag, and a private partition selected flag. With this system a traditional computer system can be changed to operate without impediments of interrupts and other prior impediments to a realAime task to perform. By providing cache partition areas, and causing an active task to always have a pointer to a private partition, and a size register to specify how many segments can be used by the task, real time systems can take advantage of a cache. Thus each task can make use of a shared partition, and know how many segments can be used by the task. The system cache provides a high speed access path to memory data, so that during execution of a task the logic means and registers provide any necessary cache partitioning to assure a preempted task that it's cache contents will not be destroyed by a preempting task. This permits use of a software controlled partitioning system which allows segments of a cache to be statically allocated on a priority I benefit basis without hardware modification to said system. The cache allocation provided by the logic gives consideration of the scheduling requirements of tasks of the system in deciding the size df each cache partition. Accordingly, the cache can make use of a for dynamic programming implementation of an allocation algorithm which can determine an optimal cache allocation in polynomial time.

While I have described my preferred embodiments of my inventions, it will be understood that those skilled in-the art, both now and in the future, upon the understanding of these discussions will make various improvements and enhancements thereto which fall within the scope of the claims which follow. These claims should be construed to maintain the proper protection for the inventions first disclosed.

What is claimed is:

1. A computer system comprising:

a processor unit, a main memory, and a cache memory buffer, logic means for reserving cache memory locations for one or more tasks to allow the tasks immediate access to the reserved cache locations and prevent one or more other tasks from using the reserved cache locations and including means for mapping tasks to cache memory buffer locations, said logic means further including means for determining the size of each cache partition depending on the execution time requirements of respective tasks of the system, and means including a plurality of registers, for containing task to cache mapping information.

2. The system of claim 1 wherein:

the cache memory buffer is divided into segments of one or more cache lines, and the logic means includes means for reserving one or more of the segments to a private partition in the cache memory buffer which can be used by one or more tasks and can not be used by one or more other tasks of the system.

3. The system of claim 2 wherein the cache memory buffer includes a shared partition for multiple tasks and one or more private partitions each for a different one or more respective tasks.

4. The system of claim 3 further comprising, register means for containing count information for the number of cache segments in a specific partition.

5. The system of claim 4 wherein register means include:

one count register for containing information for a private partition for a current active task, and another count register for containing information for a shared partition used by multiple tasks including the current active task.

6. The system of claim 3 further comprising register means for containing cache identification number information, including one register for a shared partition and one register for a private partition.

7. The system of claim 6 wherein the identification number information includes a pointer to a specific partition.

8. The computer system according to claim 8 wherein the flag register contains flags for controlling the mapping of the cache memory buffer.

9. The computer system according to claim 8 wherein the flag register includes a non-real time flag, a private partition permitted flag, and a private partition selected flag.

10. The system of claim 1 wherein said cache provides a high speed access path to memory data, and wherein the logic means include means, during execution of a task using the register, for providing cache partitioning to prevent the cache contents of a preempted task from being destroyed by a preempting task.

11. The system of claim 1 wherein the logic means includes software controlled partitioning means for statically allocating cache segments to partitions on a priority/benefit basis without hardware modification to said system.

12. The system according to claim 1 wherein the logic means includes means for optimal dynamic cache allocation in polynomial time of segments to partitions for execution of tasks.

13. The system of claim 1 which, the logic means reserves partitions for one or more privileged tasks independent of physical memory locations of the privileged tasks.

14. A computer system as recited in claim 1, wherein said logic means is arranged to always allow the tasks immediate access to the reserved cache locations and prevent one or more other tasks from using the reserved cache locations.

15. A method of controlling a computer system, comprising the steps of:

providing one or more private cache partitions each for a group of one or more tasks, protecting each of said one or more private cache partition from being overwritten by an active task when a task to which said private cache partition corresponds is preempted by a different task, loading a register with a pointer to a private partition for active task, and loading a register with a size to specify how many segments in the private partition can be used by the active task, said size being determined in accordance with execution time requirements of respective tasks of the system.

16. The method of claim 15 further comprising for each task:

providing one or more shared partitions;

loading a register with a pointer to a shared partition; and loading a register with a count indicating how many segments of the shared partition can be used by the task.

17. A multi-tasking computer system, comprising:

a processor for executing instructions on data;

a main memory for storing information including instructions and data;

means for switching execution of tasks from a preempted task to a preempting task;

a cache buffer connected for storing part of the information stored in main memory and providing the information to the processor at a higher speed than the information can be provided by main memory;

means for defining a group of one or more partitions in the cache buffer and for reserving the group of one or more partitions for use by at least one task and prevent use of the group of partitions by at least one other task; and means for determining a size of a partition in accordance with execution time scheduling requirements of respective tasks of the system.

18. The system of claim 17 further comprising, means for statically mapping tasks to partitions which can be used by the tasks such as mapping being independent of the physical location of the task in main memory.

19. The system of claim 17 further comprising:

apparatus means which signals the system to switch tasks and start execute the preempting task and which requires that the system switch to the preempting task and execute part of the preempting task within a predetermined time for proper system operation;

means for reserving a private partition in the cache which is used by the preempting task and is not normally used by other tasks between preemption and restarting of the preempting task; and means for mapping the preempting task to the private partition in the cache.

20. The system of claim 17 further comprising, means for reserving each partition for exclusive use by one task or for shared use by selected tasks or for shared use by any task.

* * * * *

UNITED STATES PATENT AND TRADEMARK OFFICE
CERTIFICATE OF CORRECTION

PATENT NO. : 5,875,464
DATED : February 23, 1999
INVENTOR(S) : David Brian Kirk

It is certified that error appears in the above-identified patent and that said Letters Patent is hereby corrected as shown below:

In column 3, line 30, delete "DRAWINGS." and replace with --DRAWINGS--.
In column 4, line 2, delete "INVENTIONS." and replace with --INVENTION--.
In column 4, line 48, delete "system" and replace with --systems--.

Signed and Sealed this

Thirtieth Day of November, 1999

Attest:

Q. TODD DICKINSON

Attesting Officer

Acting Commissioner of Patents and Trademarks